United States Patent [19]

Fischer

[11] Patent Number: 5,005,200
[45] Date of Patent: Apr. 2, 1991

[54] PUBLIC KEY/SIGNATURE CRYPTOSYSTEM WITH ENHANCED DIGITAL SIGNATURE CERTIFICATION

[76] Inventor: Addison M. Fischer, 60 14th Ave. S., Naples, Fla. 33942

[21] Appl. No.: 319,780

[22] Filed: Mar. 7, 1989

Related U.S. Application Data

[63] Continuation-in-part of Ser. No. 155,467, Feb. 12, 1988, Pat. No. 4,868,877.

[51] Int. Cl.$^5$ .............................................. H04K 1/00
[52] U.S. Cl. ........................................ 380/30; 380/25
[58] Field of Search ................................. 380/23–25, 380/30

[56] References Cited

U.S. PATENT DOCUMENTS

| | | | |
|---|---|---|---|
| 4,405,829 | 9/1983 | Rivest et al. | 380/30 |
| 4,438,824 | 3/1984 | Mueller-Schloer | 380/25 |
| 4,471,163 | 9/1984 | Donald et al. | 380/30 |
| 4,625,076 | 11/1986 | Okamoto et al. | 380/30 |
| 4,633,036 | 12/1986 | Hellman et al. | 380/30 |
| 4,759,063 | 7/1988 | Chaum | 380/30 |
| 4,759,064 | 7/1988 | Chaum | 380/30 |
| 4,771,461 | 9/1988 | Matyas | 380/25 |
| 4,799,258 | 1/1989 | Davies | 380/23 |
| 4,811,393 | 3/1989 | Hazard | 380/23 |
| 4,868,877 | 9/1989 | Fischer | 380/30 |
| 4,888,801 | 12/1989 | Forster et al. | 380/25 |
| 4,924,515 | 5/1990 | Matyas et al. | 380/25 |

OTHER PUBLICATIONS

Recommendation X.509 pp. 63–106, "The Directory Authentication Framework, CCITT & International Standards Organization".

*Primary Examiner*—Salvatore Cangialosi
*Attorney, Agent, or Firm*—Nixon & Vanderhye

[57] ABSTRACT

A public key cryptographic system is disclosed with enhanced digital signature certification which authenticates the identity of the public key holder. A hierarchy of nested certifications and signatures are employed which indicate the authority and responsibility levels of the individual whose signature is being certified. The certifier in constructing a certificate generates a special message that includes fields identifying the public key which is being certified, and the name of the certifiee. The certificate is constructed by the certifier to define the authority which is being granted and which may relate to a wide range of authorizations, delegation responsibilities or restrictions given to, or placed on the certifiee. Methodology is also disclosed by which multiple objects such as, for example, a cover letter, an associated enclosed letter, an associated graphics file, etc., are signed together. Methodology is also disclosed for digitally signing documents in which a digital signature is generated for both computer verification and for reverification if a document needs to be reconfirmed by reentering from a paper rendition.

58 Claims, 12 Drawing Sheets

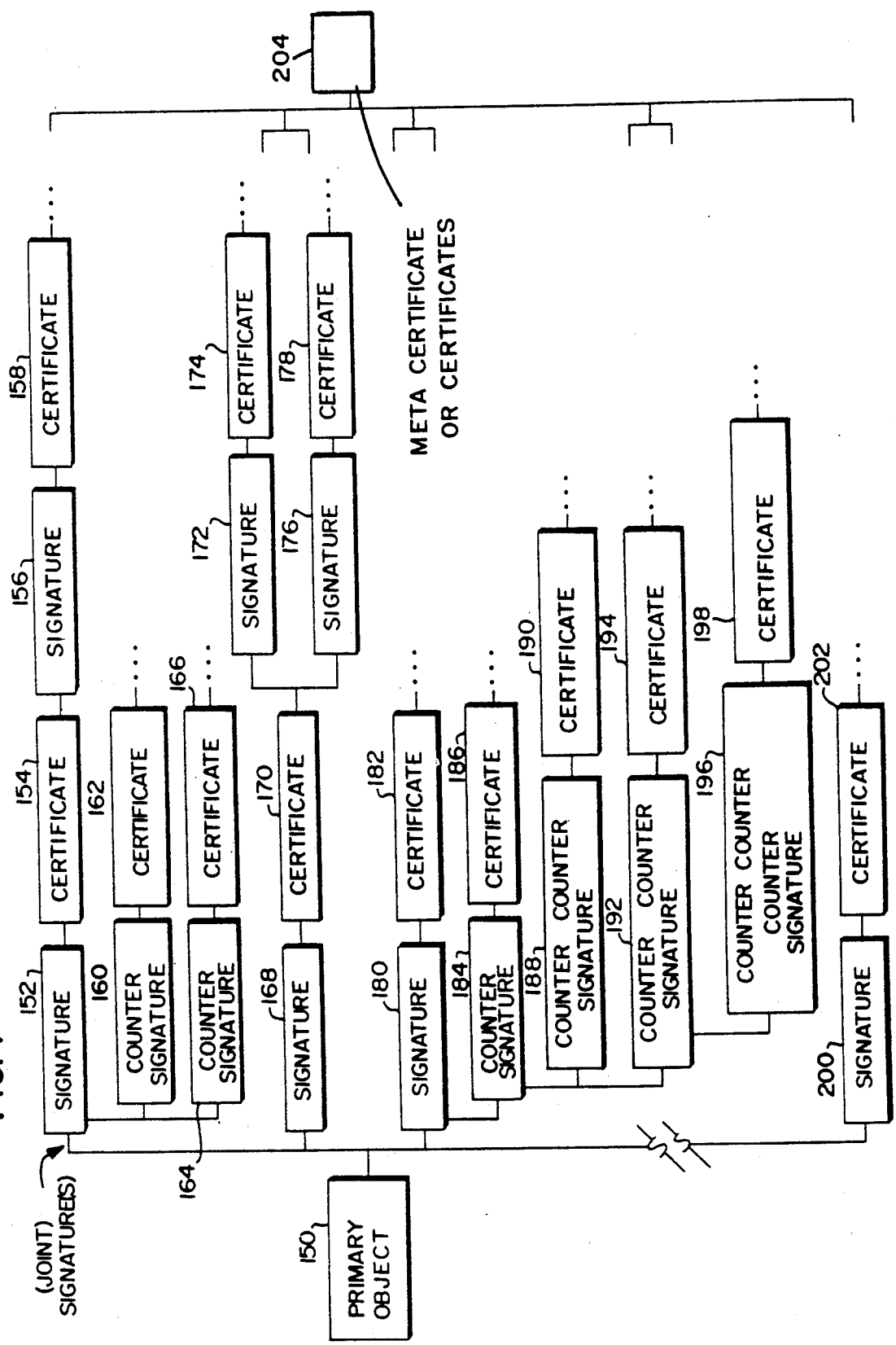

FIG. 8

```
To:     John Haberford,        Universal Widgett Corporation
From:   Bob Blakely,           Hattersfield Marine Builders
Date:   14 July 1988,  10:26 am EDT
Subj:   Widgets received Dear John,
    We received the July 12 Shipment of widgets, and found only
one item of damage, namely a nick in the paint of widget number
#4688219-A3367.

Thanks.

Digital Signature:
Signature Date: 14 Jul 1988, 10:34 am EDT
Signature & Seal:
65263317 9E035673 CAA32E6F B21988C8 0ED113F6 571B060B B1B88EEE DCE1F1B7
4DB488A8 801CE95B 30F289EC EADBFD96 C831772D 5895D945 E2E7E5AC CD510CFC
C8CF370C 2F87AB01 5638DD0F 3FBA3D7C A1583BF1 147C4477 060D28F7 3921F90E
F8EA6F90 75DA4EDF FACCBE05 A62D41E1 6B34789E 35CE84CF 0ED7DF91 35713371

Summary of Certificate governing digital signature:
Certif ID:     FB8FD88F B9BDC829   82D8C468 37619831
Certif Date:   01/23/88 04:00 pm EST
Authorized Money Limit: 5000  $US
Id of certified:
    Robert J. Blakely
    Production General Manager
    Hattersfield Marine Builders
    Naples, Florida   33942

Printing notes:
    Page numbers added by print function, not part of document.
```

PUBLIC KEY/SIGNATURE CRYPTOSYSTEM WITH ENHANCED DIGITAL SIGNATURE CERTIFICATION

This application is a continuation-in-part of application Ser. No. 155,467, filed Feb. 12, 1988.

FIELD OF THE INVENTION

This invention relates to a cryptographic communications system and method. More particularly, the invention relates to a public key or signature cryptosystem having improved digital signature certification for indicating the identity, authority and responsibility levels associated with at least the sender of a digital message.

BACKGROUND AND SUMMARY OF THE INVENTION

The rapid growth of electronic mail systems, electronic funds transfer systems and the like has increased concerns over the security of data transferred over unsecured communication channels. Cryptographic systems are widely used to insure the privacy and authenticity of messages communicated over such insecure channels.

In a conventional cryptographic system, a method of encryption is utilized to transform a plain text message into a message which is unintelligible. Thereafter, a method of decryption is utilized for decoding the encrypted message to restore the message to its original form.

Conventional crypographic signature and authentication systems typically utilize a "one way" hashing function to transform the plain text message into a form which is unintelligible. A "hashing" function as used herein is a function which can be applied to an aggregation of data to create a smaller, more easily processed aggregation of data.

An important characteristic of the hashing function is that it be a "one-way" function. A hash is a "one-way" function which should be computationally easy to compute give the underlying data. The hash function should be computationally impossible given a hash value, to either determine the underlying data, or to create any data which has the specified value as its hash. For all practical purposes, the value obtained from applying the hashing function to the original aggregation of data is an unforgeable unique fingerprint of the original data. If the original data is changed in any manner, the hash of such modified data will be different.

In conventional cryptographic systems, binary coded information is encrypted into an unintelligible form called cipher and decrypted back into its original form utilizing an algorithm which sequences through encipher and decipher operations utilizing a binary code called a key. For example, the National Bureau of Standards in 1977 approved a block cipher algorithm referred as the *Data Encryption Standard* (DES). *Data Encryption Standard*, FIPS PUB 46, National Bureau of Standards, Jan. 15, 1977.

In DES, binary coded data is cryptographically protected using the DES algorithm in conjunction with a key. Each member of a group of authorized users of encrypted computer data must have the key that was used to encipher the data in order to use it. This key held by each member in common is used to decipher the data received in cipher form from other members of the group.

The key chosen for use in a particular application makes the results of encrypting data using the DES algorithm unique. Selection of a different key causes the cipher that is produced for a given set of inputs to be different. Unauthorized recipients of the cipher text who know the DES algorithm, but who do not have the secret key, cannot derive the original data algorithmically.

Thus, the cryptographic security of the data depends on the security provided for the key used to encipher and decipher the data. As in most conventional cryptographic systems the ultimate security of the DES system critically depends on maintaining the secrecy of the cryptographic key. Keys defined by the DES system include sixty-four binary digits of which fifty-six are used directly by the DES algorithm as the significant digits of the key and eight bits are used for error detection.

In such conventional cryptographic systems, some secure method must be utilized to distribute a secret key to the message sender and receiver. Thus, one of the major difficulties with existing cryptographic systems is the need for the sender and receiver to exchange a single key in such a manner that an unauthorized party does not have access to the key.

The exchange of such a key is frequently done by sending the key, prior to a message exchange, via, for example, a private courier or registered mail. While providing the necessary security such key distribution techniques are usually slow and expensive. If the need for the sender and receiver is only to have one private message exchange, such an exchange could be accomplished by private courier or registered mail, thereby rendering the cryptographic communication unnecessary. Moreover, if the need to communicate privately is urgent the time required to distribute the private key causes an unacceptable delay.

Public key cryptographic systems solve many of the key distribution problems associated with conventional cryptographic systems. In public key cryptographic systems the encrypting and decrypting processes are decoupled in such a manner that the encrypting process key is separate and distinct from the decrypting process key. Thus, for each encryption key there is a corresponding decryption key which is not the same as the encryption key. Given the knowledge of the encryption key, it is not feasible to compute the decryption key.

With a public key system, it is possible to communicate privately without transmitting any secret keys. The public key system does require that an encryption/decryption key pair be generated. The encryption keys for all users may be distributed or published and anyone desiring to communicate simply encrypts his or her message under the destination user's public key.

Only the destination user, who retains the secret decrypting key, is able to decipher the transmitted message. Revealing the encryption key discloses nothing useful about the decrypting key, i.e., only persons having knowledge of the decrypting key can decrypt the message. The RSA cryptographic system which is disclosed in U.S. Pat. No. 4,405,829 issued to Rivest et al discloses an exemplary methodology for a practical implementation of a public key cryptographic system.

A major problem in public key and other cryptographic systems is the need to confirm that the sender of a received message is actually the person named in the message. A known authenticating technique utilizing "digital signatures" allows a user to employ his secret key to "sign a message" which the receiving party or a third party can validate using the originator's public key. See for example U.S. Pat. No. 4,405,829.

With the advent of such digital signatures, it is now possible for any digital message to be signed so that the recipient is assured that the message is received as sent, and that it is not a forgery. This is done by using the "public key" and digital signature methodology such as described by at least U.S. Pat. No. 4,405,829, hereinafter referred to as RSA technique. There are other public key and signature techniques which use methodologies other than RSA. Examples of other public key or signature techniques include Fiat-Shamir, Ong-Schnorr-Shamir, and several others derived from zero-knowledge proof techniques. While none of these other techniques include the privacy capabilities of RSA, they do allow for digital signatures. The present invention is not limited to any particular public key or signature technique.

A user who has filed a public key in a publicly accessible file can digitally sign a message by "decrypting" (or "signing") the message or a hash of it with the user's private key before transmitting the message. Recipients of the message can verify the message or signature by encrypting it with the sender's public encryption key. Thus, the digital signature process is essentially the reverse of the typical cryptographic process in that the message is first decrypted and then encrypted. Anyone who has the user's public encryption key can read the message or signature, but only the sender having the secret decryption could have created the message or signature.

In general, the digital signature assures the recipient of the integrity of the message at the time the signature was computed. However, the authenticity of the signer is only assured to the extent that the recipient is assured that the public key used to sign the digital message actually belongs to the purported sender. This issue becomes more important as the use of digital signatures become more widespread, and the various correspondents (perhaps otherwise unknown to each other) obtain one another's public keys through centrally maintained "directories" (or any other means).

Thus, serious problems still persist in public key cryptosystems of assuring that a specified public key is that actually created by the specified individual. One known technique for addressing this problem is to rely on some trusted authority, e.g., a governmental agency, to insure that each public key is associated with the person claiming to be the true author.

The trusted authority creates a digital message which contains the claimant's public key and the name of the claimant (which is accurate to the authority's satisfaction) and a representative of the authority signs the digital message with the authority's own digital signature. This digital message, often referred to as a certificate, is sent along with the use of the claimant's own digital signature. Any recipient of the claimant's message can trust the signature, provided that the recipient recognizes the authority's public key (which enables verification of the authority's signature) and to the extent that the recipient trusts the authority.

Certificates can be thought of as brief messages which are signed by the trusted authority, and which contain, either explicitly or implicitly, a reference to the public-key which is being therein certified, and the identity of the public key's owner (creator). In such an implementation, if "C" has provided a certificate for "A"; then recipient "B" can trust the use of "A's" public key, provided that "B" trusts "C", and provided that "B" possesses "C's" certification of "A's" public key.

In conventional communication systems, the transmitted certificate does not provide any indication of the degree of trust or the level of responsibility with which the sender of the message is empowered. Instead, the certification merely indicates that the identified trusted authority recognizes the sender's public key as belonging to that person.

The public key system is designed to operate such that the public keys of various users are published to make private communications easier to accomplish. However, as the number of parties who desire to use the public key system expands, the number of published keys will soon grow to a size where the issuing authority of the public keys can not reasonably insure that the parties whose public keys are published are, in fact, the people who they are claiming to be. Thus, a party may provide a public key to be maintained in the public directory under the name of the chairman of a major corporation, e.g., for example, General Motors Corporation. Such an individual may then be in a position to receive private messages directed to the chairman of General Motors or to create signatures which ostensibly belong to the impersonated chairman.

There are also technologies for producing digital signatures which may not require full public key capability, including, for example, the Fiat-Shamir algorithm. Any reference to public key cryptosystems should also be construed to reflect signature systems. Any reference to public key decryption should be taken as a generalized reference to signature creation and any reference to encryption should be taken as a reference to signature verification.

The present invention addresses such problems with public key or signature cryptographic systems relating to authenticating the identity of the public key holder by expanding the capabilities of digital signature certification. In this regard, a certification methodology is utilized which employs multiple level certification while at the same time indicating the "authority" of the individual whose signature is being certified as will be described in detail below. As used herein, an indication of "authority" broadly refers to any indication of power, control, authorization, delegation responsibilities or restrictions placed thereon through the use of digital signatures or certificates.

The present invention enhances the capabilities of public key cryptography so that it may be employed in a wider variety of business transactions, even those where two parties may be virtually unknown to each other.

The present invention advantageously provides the ability to specify a variety of attributes associated with the certification. These attributes extend beyond merely assuring the correct identity of an individual, and actually specify the authority or constraints (in a wide variety of situations) which are conferred on the certifiee by certifier.

For example, the present invention allows a corporation to not only certify that a particular public key is used by a particular employee, but also allows that corporation to explicitly state the authority which it has granted that individual in the context of his employment, and use of that key on the corporation's behalf.

The types and classes of authority which are granted are not limited. In the present invention, a digital signature is certified in a way which indicates the authority the has been granted to the party being certified (the certifiee). The certifier in constructing a certificate generates a special message that includes fields identifying the public key which is being certified, and the name and other identification of the certifiee. In addition, the certificate constructed by the certifier includes the authority which is being granted and limitations and safeguards which are imposed including information which reflects issues of concern to the certifier such as, for example, the monetary limit for the certifiee and the level of trust which is granted to the certifiee. The certificate may also specify co-signature requirements as being imposed upon the certifiee. Some of the more practical classes of authority and/or limitations thereon contemplated by the present invention are summarized below:

A certificate may include the monetary amount which a certified employee is able to authorize using a particular digital signature. Such a limitation will become increasingly important as more and more business is transacted electronically over digital networks. Since this limitation is "built-in" to the certificate, it allows any recipient to know immediately whether, for example, a digitally-signed purchase order is valid.

The present invention may also require digital "co-signatures" to be used whenever a particular certified public key is used. The term "co-signature" is used to encompass either "joint" or "countersignatures". As used herein, joint signatures are signatures which are applied directly to the same "object" (e.g., document purchase order), whereas counter signatures are signatures which are applied to another signature. In principle, joint signatures can be applied "in parallel", in any order, whereas a counter signature specifically "ratifies" an existing signature. Thus, the digital signature certification method and apparatus of the present invention provides for a hierarchy of certifications and signatures. With respect to co-signature requirements, counter-signature and joint-signature requirements are referenced in each digital certification to permit business transactions to take place electronically, which heretofore often only would take place after at least one party physically winds his way through a corporate bureaucracy. This will allow an organization to mimic, for example, the current practice of requiring multiple signatures to authorize spending (or any other sensitive purpose that may be deemed appropriate). Since this requirement is built into the digital certificates of the present invention, it will be clear to the receiver when (one or more) co-signatures are required, and the recipient (or the recipient's software) can determine whether the necessary appropriate co-signatures are present.

The present invention further provides for certifying digital signatures such that the requirement for further joint certifying signatures is made apparent to any receiver of a digital message. The requirement for joint signatures is especially useful, for example, in transactions where money is to be transferred or authorized to be released. To accomplish this end, the certificate of the present invention is constructed to reflect (in addition to the public key and the name of the certifiee and other fields) the number of joint signatures required and an indication as to the identity of qualifying joint signers. Thus, an explicit list of each of the other public key holders that are required to sign jointly may be included in the certificate. In this fashion, the recipient is informed that any material which is signed by the authority of the sender's certificate, must also be signed by a number of other specified signators. The recipient is therefore able to verify other joint and counter signatures by simply comparing the public keys present in each signature in the certificate. The present invention also includes other ways of indicating co-signature requirements such as by referencing other certificates. Such indications of other public key holders may be explicit (with a list as described here), or implicit, by specifying some other attribute or affiliation. This attribute or affiliation may also be indicated in each co-signer' certificate.

The present invention contemplates building "clearance" levels into the certificate. For example, this allows the military (or any organization concerned about security), to incorporate security into their certificates. This feature allows for the confirmation of the exact security level of the person who authored a signed message.

Conversely, and perhaps more important, is the ability to provide an additional level of checking when sending digital messages: when messages are encrypted (a process which also requires a recipient's public key and therefore the recipient's certificate) the computer system embodying the present invention will be able to insure that all recipients have the proper security authorization to receive a particular message containing sensitive information.

Additionally, the present invention provides for the certification of digital signatures such that a trust level is granted to the recipient for doing subcertifications. In this manner, a trust level of responsibility flows from a central trusted source.

In an exemplary embodiment of the present invention, a certifier is permitted to assign with one predetermined digital code, a trust level which indicates that the certifier warrants that the user named in the certificate is known to the certifier and is certified to use the associated public key. However, by virtue of this digital code, the user ("certifiee") is not authorized to make any further identifications or certifications on the certifier's behalf. Alternatively, the certifier may issue a certificate having other digital codes including a code which indicates that the user of the public key is trusted to accurately identify other persons on the certifier's behalf and (perhaps) is even further trusted to delegate this authority as the user sees fit.

The present invention further provides for a user's public key to be certified in multiple ways (e.g., certificates by different certifiers). The present invention contemplates including the appropriate certificates as part of a user's signed message. Such certificates include a certificate for the signer's certifier and for the certifiers' certifier, etc., up to a predetermined certificate (or set of mutually referenced co-certificates) which is trusted by all parties involved. When this is done, each signed message unequivocally contains the ladder or hierarchy of certificates and the signatures indicating the sender's authority. A recipient of such a signed message can verify that authority such that business transactions can be immediately made based upon an analysis of the signed message together with the full hierarchy of certificates.

The present invention provides the ability to hierarchically administer a large system or group of systems; and to do so in a fashion with maximum control, and which minimizes the possibility of error, corruption, subterfuge or mischievous disruption.

Since the certificates created by the present invention convey not only simple identification, but also authority, restrictions and limitations, including monetary authority, it is extremely important that certification be accurately implemented and carefully controlled. In a large organization (or group of organizations), it becomes more difficult to centrally confirm everyone's identity (not to mention their authority). Also there is constant change' employees will need to be re-issued certificates as their status' change. The present invention incorporates distributed, hierarchial administration to meet these needs.

The present invention enforces limitations and accountability from hierarchy to hierarchy so that the recipient of any message signed with such a (hierarchically derived) certificate can be assured that the authority represented by the signer is strictly accounted.

This is accomplished by 1) including as part of each certificate the statement (in a form readily checked by computer, as well possibly by human confirmation) the powers, authority and limitations which are being granted.

2) Stipulating in each certificate, the powers and authorities which the certifier will permit to be further hierarchically granted (if at all).

3) When important, valuable or sensitive authority is being granted, including possibly the power to in turn grant authority to a yet further level, or the power to authorize money or other sensitive resource, the requirement of multiple signatures (co-signatures) can be stipulated. Such co-signatures may be explicitly indicated (by reference to another certificate, or public key), or implicitly (by specifying a class of certificates or public keys, or by some abstract grouping or identification).

This enforces checks and balances, and mutual decisions, and automatic policing when sensitive powers are exercised. This also enhances the integrity of the entire system by reducing the chance that corruption will occur, and if it does occur, to minimize and isolate any damage. The risk of collusion can always be reduced by increasing the required number of necessary co-signers.

4) In large organizations, the private aspect of public keys will occasionally become compromised (perhaps through carelessness by their owners), and it may be necessary to issue cancellations notices throughout a network.

In the current state of the art, the only practical way to do this is for the maker of a certificate (the certifier) to cancel a certificate. Otherwise, a malicious or mischievous entity could create bogus cancellation notices and wreak havoc by falsely cancelling innocent users' certificates.

The present invention may be used to control cancellation in a distributed manner, so that the actual maker of a certificate is not required to always also be the canceller. This allows the "police" power to be safely regulated, but without requiring the constant attention of those who define the certificates and insure their accuracy.

The present invention additionally provides a methodology by which multiple objects such as, for example, a cover letter, an associated enclosed letter, an associated graphics file, etc., may be signed together in such a way that each object is individually verifiable and while also indicating the relationship of each object to the whole group. An aggregation of data related to all of these objects (possibly the HASH of each of these objects together with control information) is gathered into an ordered list. This ordered list is then viewed as an object and is signed or the hash of the list is signed. This list shows that the signer individually recognized the associated objects as well as their context in the group. Thus, each element of this ordered list is processed by a hashing algorithm (to generate a more compact version thereof) which results in a list of presignature hash values. The presignature hash list is then run through a decrypt (signature) cycle to result in the signer's signature, hereinafter referred to as seal, which becomes part of the signature packet as will be described in detail below.

The present invention further provides a methodology for digitally signing documents in which the signature is generated for both computer verification and for reverification if a document needs to be reconfirmed in the future by reentering it from a paper rendition. To accomplish this end, two hash values are utilized in digital signatures of document-type computer messages. The first hash value which is utilized relates to the exact bit-for-bit data in the file. This will allow for validation of the exact original document as long as it is accessible in computer readable form.

The present invention also embodies a second auxiliary hash value which is taken across the same data in the file, except the data used for the second hash value is "white-space-normalized". This white space normalization allows the data to be re-entered from a printout at some future time, if necessary, without having to worry about what kind of unprintable, unseen control characters may have existed on the original.

It should be recognized that in any given application, the public key, certificate and digital signature may be designed to perform distinct but somewhat overlapping functions. In this regard, one might possibly include in the "public" key certain aspects of what is referred to herein as the "certificate". Conversely, the certificate could be constructed as containing the public key as part of it. Similarly, some or part of the certificate and/or public key could be embedded as part of a signature. This possibility is especially important to keep in mind when the signature applies to authorizing another certificate. Thus, the specific examples shown in the detailed description which follows should not be construed as limiting the present invention.

BRIEF DESCRIPTION OF THE DRAWINGS

These as well as other features of this invention will be better appreciated by reading the following description of the preferred embodiments of the present invention taken in conjunction with the accompanying drawings of which

FIG. 7 is a flow diagram that indicates how the signatures and certificates are verified by a recipient of the transmitted message;

FIG. 8 is an exemplary memorandum to be electronically transmitted that includes a digital signature section;

DETAILED DESCRIPTION OF THE PRESENTLY PREFERRED EMBODIMENT

Figure 1:
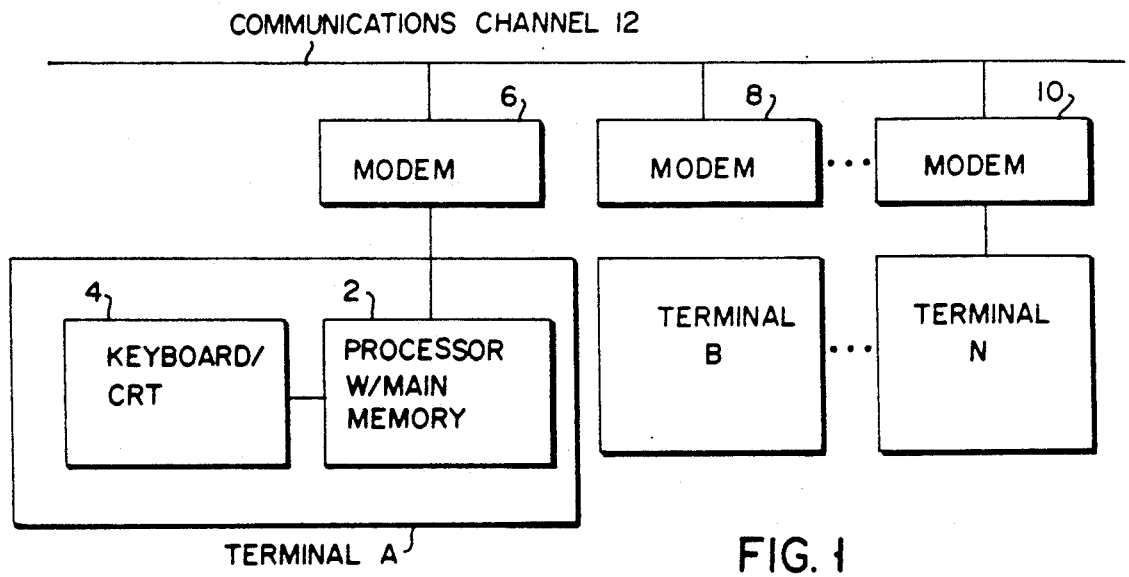
FIG. 1 is a block diagram of a cryptographic communications system in accordance with an exemplary embodiment of the present invention.

FIG. 1 shows in block diagram form an exemplary communications system which may be used in conjunction with the present invention. This system includes an unsecured communication channel 12 over which communications between terminals A,B . . . N may take place. Communication channel 12 may, for example, be a telephone line. Terminals A,B through N may, by way of example only, be IBM PC's having a processor (with main memory) 2 which is coupled to a conventional keyboard/CRT 4. Each terminal A,B through N also includes a conventional IBM PC communications board (not shown) which when coupled to a conventional modem 6, 8, 10, respectively, permits the terminals to transmit and receive messages.

Each terminal is capable of generating a plain text or unenciphered message and performing whatever signature operation may be required, and transmitting the message to any of the other terminals connected to communications channel 12 (or to a communications network (not shown) which may be connected to communications channel 12). Additionally, each of the terminals A,B through N is capable of performing signature verification on each message.

Each of the terminal users (as discussed above with respect to public key systems) has a public encrypting key and an associated private secret decrypting key. In the public key cryptosystem shown in FIG. 1, each terminal user is aware of the general method by which the other terminal users encrypt a message. Additionally, each terminal user is aware of the encryption key utilized by the terminal's encryption procedure to generate the enciphered message.

Each terminal user, however, by revealing his encryption procedure and encryption key does not reveal his private decryption key which is necessary to decrypt the ciphered message and to create signatures. In this regard, it is computationally unfeasible to compute the decryption key from knowledge of the encryption key.

Besides the capability of transmitting a private message, each terminal user likewise has the capability of digitally signing a transmitted message. A message may be digitally signed by a terminal user decrypting a message with his private decrypting key before transmitting the message. Upon receiving the message, the recipient can read the message by using the sender's public encryption key. In this fashion, the recipient can verify that only the holder of the secret decryption key could have created the message. Thus, the recipient of the signed message has proof that the message originated from the sender. Further details of an exemplary digital signature methodology which may be used in conjunction with the present invention is disclosed in U.S. Pat. No. 4,405,829.

Before describing the details of the enhanced digital certification in accordance with the present invention, the general operation of FIG. 1 in, for example, an electronic mail, public key cryptographic context will initially be described. Initially, presume that the user of terminal A is a relatively low level supervisor of a General Motors computer automated design team who wishes to purchase a software package from a computer software distributor located in a different state. The computer software distributor has terminal N and an associated modem 10 located at his store.

The General Motors supervisor at terminal A constructs an electronic purchase order which identifies the item(s) being ordered and the address to which the items must be sent as well as other items which are necessary in a standard purchase order. It should be recognized that, although this example relates to an electronic purchase order, any aggregation of data which can be represented in a manner suitable for processing with whatever public-key method is being used for signatures may likewise be transmitted. In the more detailed description which follows such an aggregation of data, e.g., a computer data file, will generically be referred to as an "object".

The terminal A user, the General Motors supervisor, digitally signs the purchase order under the authority of a certificate which is appended to the transmitted message which will be discussed further below. Turning first to the supervisor's digital signature, a message can be "signed" by applying to at least a portion of the object being signed, the privately held signature key. By signing an image of the object (or a more compact version thereof known as a digest or hash of the object to be explained in more detail below) with the secret key, it is possible for anyone with access to the public key to "encrypt" (i.e., reverse) this result and compare it with the object (or a recomputed hash or digit version thereof). Because only the owner of the public key could have used the secret key to perform this operation, the owner of the public key is thereby confirmed to have signed the message. It is noted that other methods besides "encryption" may be appropriate for different signature schemes such as Fiat-Shamir.

In accordance with the present invention, a digital signature is additionally accompanied by at least one valid certificate which specifies the identity of the signer and the authorization which the signer has been granted. The certificate may be viewed as a special object or message which specifies the identity of the user of a particular public key and the authority which has been granted to that user by a party having a higher level of authority than the user.

To be valid a certificate must be signed by the private key(s) associated with one or more other valid certificates which are hereafter referred to as antecedents to that certificate. These may also be accompanied by restrictions and/or mandatory restraints which must be met (such as, perhaps, co-signatures). Each of these antecedent certificates must grant the signer the authority to create such a signature and/or to issue the purchase order in our example. These may also be accompanied by restrictions and/or mandatory restraints which must be met (such as, perhaps, co-signatures). Each of the antecedent certificates may in turn have its own antecedent(s).

An exemplary embodiment of the present invention contemplates utilizing an ultimate antecedent certificate of all certificates, which is a universally known and trusted authority, e.g., hypothetically the National Bureau of Standards, and which is referred to as a meta-certificate. The meta certificate is the only item that needs to be universally trusted and known. A meta-certificate requires no signature. Any meta-certificate is assumed to be widely publicized and distributed. There may be several meta-certifiers, and it is possible that several meta-certificates may even reference each other for required co-signatures.

The use of multiple meta-certifiers may be important in many applications. Although each of the meta-certifiers may be respected, any member corporation must necessarily be concerned with the threat of corruption. By requiring several meta-certifiers, each "above reproach", to all independently participate in creating the "top level" certificates for each organization, any actual or perceived risk is substantially reduced. Furthermore, since co-signature requirements can be established within each organization, as each organization sees fit, each organization can control the risk of corruption within their own organization.

Turning back to our example, when the message is ultimately transmitted from terminal A to the computer software distributor at terminal N, the recipient in a manner which will be described in detail below, verifies the signature of the General Motors supervisor. Additionally, he verifies that all the other signatures on the message certificate and the antecedent certificates are present which provides further assurance to the terminal N software distributor that the transaction is a valid and completely authorized. As should be recognized, such assurances are critically important prior to shipping purchased items and are perhaps even more important in an electronic funds transfer context.

Any party who receives a message transmitted by the user of terminal A (whether such a party is the ultimate recipient of the message at terminal N or other parties within for example a corporate hierarchy such as General Motors) can verify and validate A's signature and the authority that the terminal A user exercised. Such validation is possible since a complete hierarchy of validating certificates is transmitted with the original purchase order which permits the ultimate recipient to feel confident that the requested transaction is authentic and properly authorized.

Focusing more generically on major transactions emanating from, for example, General Motors Corporation, it is helpful to focus first on the ultimate certifier(s) mentioned above, i.e., the meta-certifiers. In this regard, General Motors and parties who plan to do business with General Motors or otherwise participate in the public key cryptosystem may initially choose to approach a universally recognized trusted authority e.g., hypothetically the Bureau of Standards and/or one of the country's largest banks. Corporate and other participants in this system present a set of public keys (which they are authorized to use by virtue of an action of their corporate board of directors) together with sufficient substantiating documentation and proof, to the meta-certifier. These are "high level" keys to be used within the General Motors environment primarily for certifying General Motors' internal personnel. The meta-certifier (or each meta-certifier) in return distributes to General Motors its certification that each of these supplied public keys was created by proper General Motors authorities for their own use. In effect, the meta-certifier is certifying that the party using each key is actually associated with General Motors. The meta-certifier's certification may include embedded text which indicates that the users of registered public keys are properly associated with General Motors. For example, General Motors may decide to have three "high level" keys certified, e.g., corporate officers, such as the vice president, financial officer, and the security officer. At General Motors' request each of the three certificates might be structured to indicate the public keys of the other two as required joint signatures.

Thus, once having obtained the highest level certificate(s) from the meta-certifier, these several officials within General Motors may have to jointly sign certificates at the next lower level. Typically, each of these high level General Motors' certificates would mutually reference each other as required co-signers. Thus, at this level no single corporate officer acting alone could fully authorize anything because embedded within each of the three certificates is a requirement for the signature of others who are specifically identified. In turn then, these 3 officers create and sign public keys for the other General Motors' employees, that define exactly the level of authority, responsibility and limitations each employee is to have. One of these certificates may belong to user A, or will be an antecedent to user's A's certificate.

Each of these three high level certificates may digitally sign terminal B user's certificate preferably after a face to face or other personal verification and recognition confirmation. After each of the required signatures has been created, the certificate's signatures by the vice president, financial officer and security officer as well as their respective 3 certificates, as well as those certificates' respective signatures by the meta-certifier are ultimately returned to the General Motors' supervisor at terminal B to be stored for ongoing use, such as in our example for subcertifying terminal user A. In this manner, the signed message unequivocally contains the ladder or hierarchy of certificates and signatures verifying terminal A user's identify and his authority.

When a party B in a ladder of certifications creates an authorizing certificate for party A, the certificate includes a specification of A's identity together with A's public encryption signature/key. Additionally, the certificate indicates the authority, capabilities and limitations which B wishes to grant A. By granting this certificate B explicitly assumes responsibility for both A's identity and authority.

B's certificate for A also permits a specification of other parties who are required to cosign actions taken by A when using this certificate as will be explained further below. Cosignatures may take the form of either joint signatures or countersignatures. Additionally party B can define in the certificate for A the degree to which B will recognize subcertifications performed by A.

In accordance with an exemplary embodiment of the present invention, trust levels which are granted by the certifier to the certifiee are specified in the certificate by a predetermined digital code. Such a trust level is used by the recipient of the message as an indicator of the authority granted to the certifiee and the responsibility assumed by the certifier for the certifiee's actions with respect to the use of the public key being certified.

By way of example, only trust levels may be indicated by trust level values 0, 1, 2, and 3.

Trust level 0 indicates that the certifier vouches that the certified public key belongs to the individual named in the certificate; but that the certifier will not assume responsibility for the accuracy of any certificates produced by the certifiee. The essence of this would be a statement by the certifier that: "I warrant the user named in this certificate is known to me and is being certified to use the associated public key—however I do not trust him to make any further identifications on my behalf".

Trust level 1 empowers the certifiee to make level 0 certifications on behalf of the certifier. The essence of this would be a statement by the certifier that: "I know the user of this public key and I trust him/her to accurately identify other persons on my behalf. I will take responsibility for such identifications. However, I do not trust this person to judge such identified persons as themselves being trustworthy."

Trust level 2 empowers the certifiee to make level 0, 1 and 2 certifications on behalf of the certifier. The essence of this would be a statement by the certifier that: "I know the user of this public key and I trust him/her to accurately identify other persons on my behalf, and I furthermore trust them to delegate this authority as they see fit. I assume due responsibility for any certifications done by them or any duly authorized agent created by them or by other generation of duly created agents".

Trust level 3 is reserved exclusively for an ultimate meta certifier whose public key and certificate is established and also well known (possibly by repetitive and widespread media publication) and whose accuracy is universally respected. This certifier takes responsibility only for accurately identifying the entities whose public keys it certifies. It assumes no responsibility for the use of these keys.

A certifier may also empower another person to cancel other certificates which the certifier has produced. It is typically assumed that any certifier is able to cancel or revoke a certificate in which he participated. It is also typically assumed that a certifiee is permitted to revoke his own certificate if he has reason to believe it has been compromised. In addition, the present invention operates to prevent "just anyone" from adding their signature to an existing certificate (in which case they might then appear to be authorized to cancel it). The present invention incorporates into a certificate a hash of an original signer's public key or certificate, as well as an indication (generally either the hash of the public key or certificate, but possibly some other abstract identifier or group code) of the other entities who are allowed to also sign the certificate. The other signers may be needed to properly authorize all the powers defined for the certifiee. The present invention contemplates creating certificates which grant powers such that no one certifier individually may fully possess.

It may be advantageous for certifiers to allow (selected) other users to be able to exercise "police" powers on their behalf. The exemplary embodiment therefore utilizes a method whereby a certificate may reflect "police" (i.e., cancellation) powers granted by the certifier(s). In this embodiment, cancellation powers are distinct from the "identification" trust levels defined above. In one mode of the invention, a certifier may grant one of 4 cancellation powers:

0—The user is granted no special ability to cancel other certificates controlled by the certifier.

1—The user is able to cancel any certificate which the certifier can cancel (subject to any restrictions which may be passed along).

2—Similar to 1, except the user is able to delegate the granted cancellation authority (but, the user cannot delegate power to further obligate).

3—Similar to 2, except the user may also fully delegate the ability to (fully) delegate.

Alternatively, such cancellations powers may be associated with the trust levels. Thus, by way of example only, trust level 1, or level 2 may also carry within an associated power to cancel a certificate.

In this manner, the power to control cancellation is distributed so that the maker of the certificate is not required to always be the canceller. A separate trust level may alternatively be defined carrying with it solely the power to cancel certificates.

Additionally, if utilized in an organization, dealing with extremely sensitive business or military information, clearance levels may also be defined in the certificate. In this fashion, a certificate may specify the exact security level of the person who authorized a signed message.

Additionally, each certification may specify the monetary limit, i.e., the maximum amount of money value which the certifiee is authorized to deal with. The monetary limit must not of course exceed the limit in the certifier's own certificate to insure that the certifier does not delegate more than he is allowed to handle. Such a limitation is easily enforced when a recipient receives the set of certificates.

Before discussing further details of the digital signature and certification techniques of the present invention, it may be helpful to first define certain terminology. As noted above, the term "object" is generically used to describe any aggregation of data that can be ultimately represented in a manner suitable for processing with whatever public key method is being utilized for signatures and/or encryption. The term object may apply to a "primary" object such as a purchase order or check, or money transfer or a certificate; or to a "secondary" object, namely another signature.

The methodology of the present invention in order to increase processing efficiency generally applies a function to the object to create a generally smaller, more compact, more easily processed object, i.e., typically a fixed size bit string of several dozen or more bits. Such a function is referred to as a hash or digest of the object. However, such a function is not strictly necessary, and any other "unique" representation of an object could be used, including the exact object itself.

An example of such a hash or digest would be the output obtained by processing an image of the object with the data encryption standard (DES) using cipher block chaining mode (CBC). Processing may be done with two different DES keys (both of which are fixed, non-secret and commonly known). Thereafter, each of the final output chaining values are concatenated or merged in some way perhaps using an exclusive "OR" operation to become the several dozen or more bits constituting the digest or hash value. Another hash method known as "Square-mod-n" is described in the X.500 authentication draft.

An important characteristic of the digest or hashing algorithm is that, while it is easy to compute the digest of an object it is essentially impossible to construct a different or modified object with an equal digest. For all practical purposes the digest is an unforgeable unique fingerprint of the original object. If the original object is changed in any manner, the digest will be different. In other words, for all practical purposes, the more compact representation of the original object is unique to the original object. Ideally, also a hash should not reveal any clue about specific data values contained within the message. The hashs contemplated in the exemplary embodiment have at least 128 bits.

Figure 2:
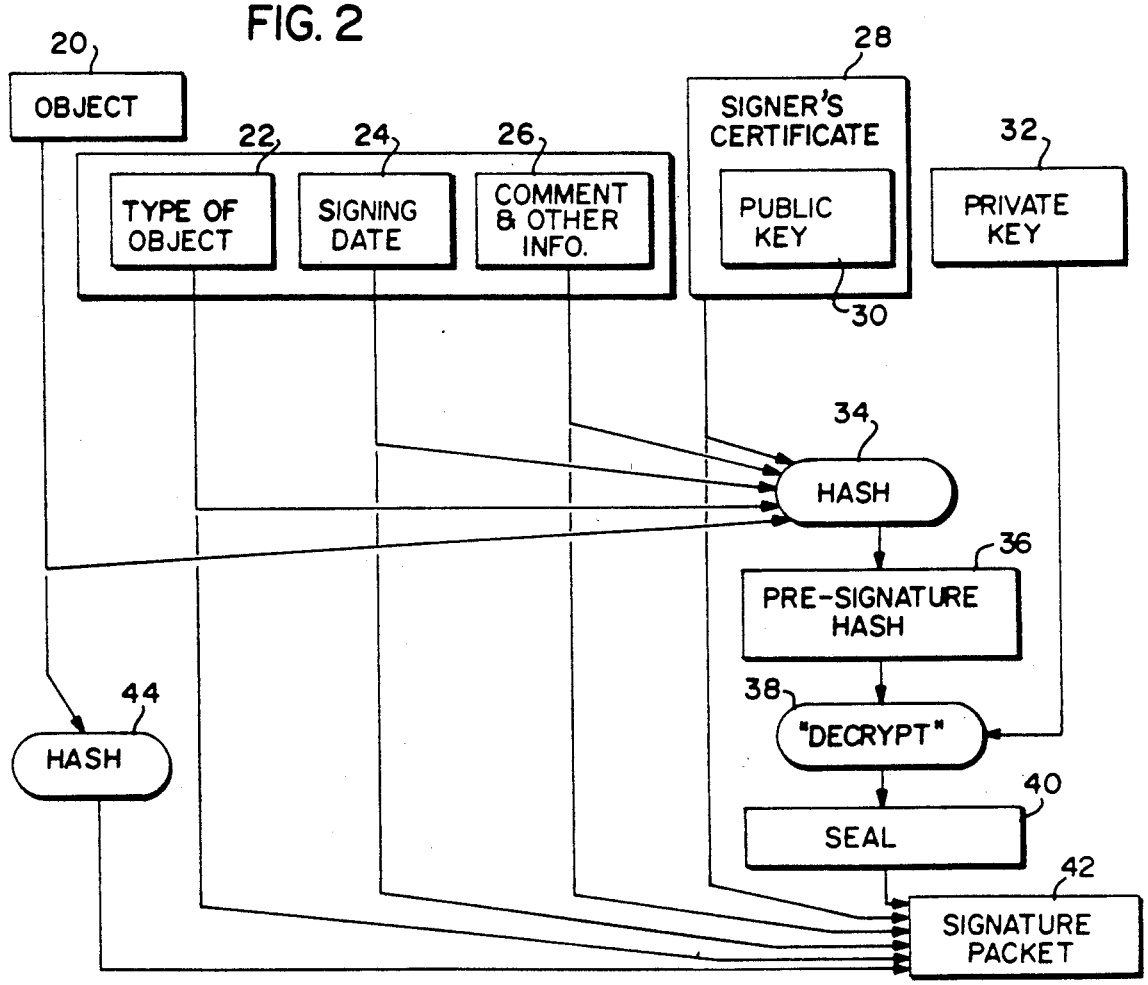
FIG. 2 is a flow diagram that indicates how a digital signature is created in accordance with an exemplary embodiment of the present invention.

Turning now to FIG. 2, this figure shows the data flow and the manner in which signatures are created. The signature process applies not only to general objects such as arbitrary computer files, letters, electronic purchase orders, etc., but also to specialized objects such as signatures and certificates.

Figure 5:
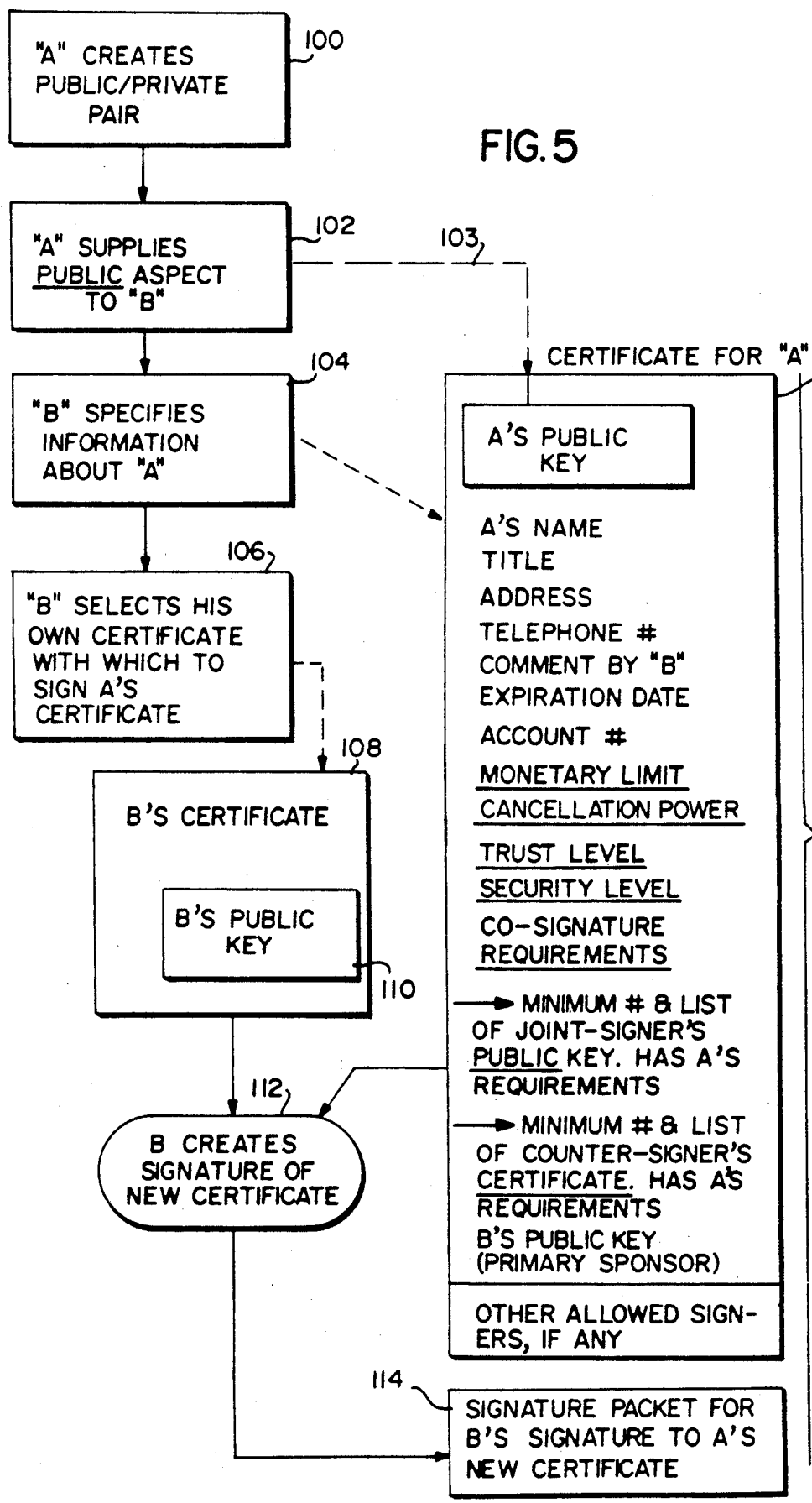
FIG. 5 is a flow diagram that indicates how a digital certificate in created in accordance with an exemplary embodiment of the present invention.

Each digital signature is accompanied, as is generally shown in FIG. 2, by a certification of the public key performing the signature. The certificate, as will be discussed in detail in conjunction with FIG. 5, is signed by one or more higher authorities (i.e., the immediate certifiers) and identifies the original signer while specifying the degree of authority which has been granted to the original signer.

In accordance with the present invention, the original signer may have more than one certificate and may utilize different certificates for different levels of authority. Each of the certificates may carry different limitations and requirements including different money limitations, trust levels, joint signature requirements and counter signature requirements.

It is incumbent on the signer to select the appropriate signature/certificate with which to sign a particular object. For example, purchase orders may require a different type of authority (and therefore a different certificate) than merely a letter of inquiry. Thus, the certificate is a very important portion of the transmitted message in that it identifies the signer as well as the signer's level of authority.

As shown in FIG. 2, in creating the signature the user utilizes the object 20 (which may, for example, be a purchase order) and specifies the type of object 22. The documentation added under the type of object field, for example, indicates that the object is a purchase order data file. In other instances the type of object field 22 would identify that the object is another signature or a certificate. As indicated at 24, the date of the signature is also identified.

The comment field 26 is utilized to add documentation which, for example, places limitations on the signature or adds other commentary. The signer may indicate that his signature of the object is only good and valid for a predetermined period of time. Additionally, any desired comments regarding the particular transaction, e.g., the purchase order, may be added as comment data.

Also incorporated in the signature is the original signer's certificate 28 which includes the original signer's public key 30 and numerous other fields which are discussed in detail below in conjunction with FIG. 5. As noted above, public key signature methods require the use of a public key 30 and an associated private key which is shown in FIG. 2 at 32.

The object field 20 (e.g., purchase order data), the type of object field 22, the signing date field 24, the comment field 26, and the signer's certificate field 28 are hashed via a hashing algorithm at 34 to enhance processing efficiency. Additionally, each of the fields 44, 22, 24, 26 and 28 are incorporated in the signature packet 42 to become part of the signature record. A hashing algorithm 44 is also applied to the object 20 to place it in a more compact form prior to incorporation in the packet 42.

After application of the hashing algorithm 34 to the fields previously discussed, a presignature hash results therefrom as indicated at 36. The presignature hash 36 is then run through a decrypt (signature) cycle as indicated at 38 using the signer's private key 32 to thereby result in the signer's signature, hereinafter referred to as the seal 40. The seal 40 together with items 20 (or 44 the hash of 20), 22, 24, 26 and 28 become the final signature packet 42.

When this signature is transmitted with the associated object, it allows the recipient to verify that the object is intact as it was signed. Furthermore, when sufficient certificates are also included, the recipient can validate the true identity of the signer and the authority which has been granted in the signer's chain of certificates.

Figure 3:
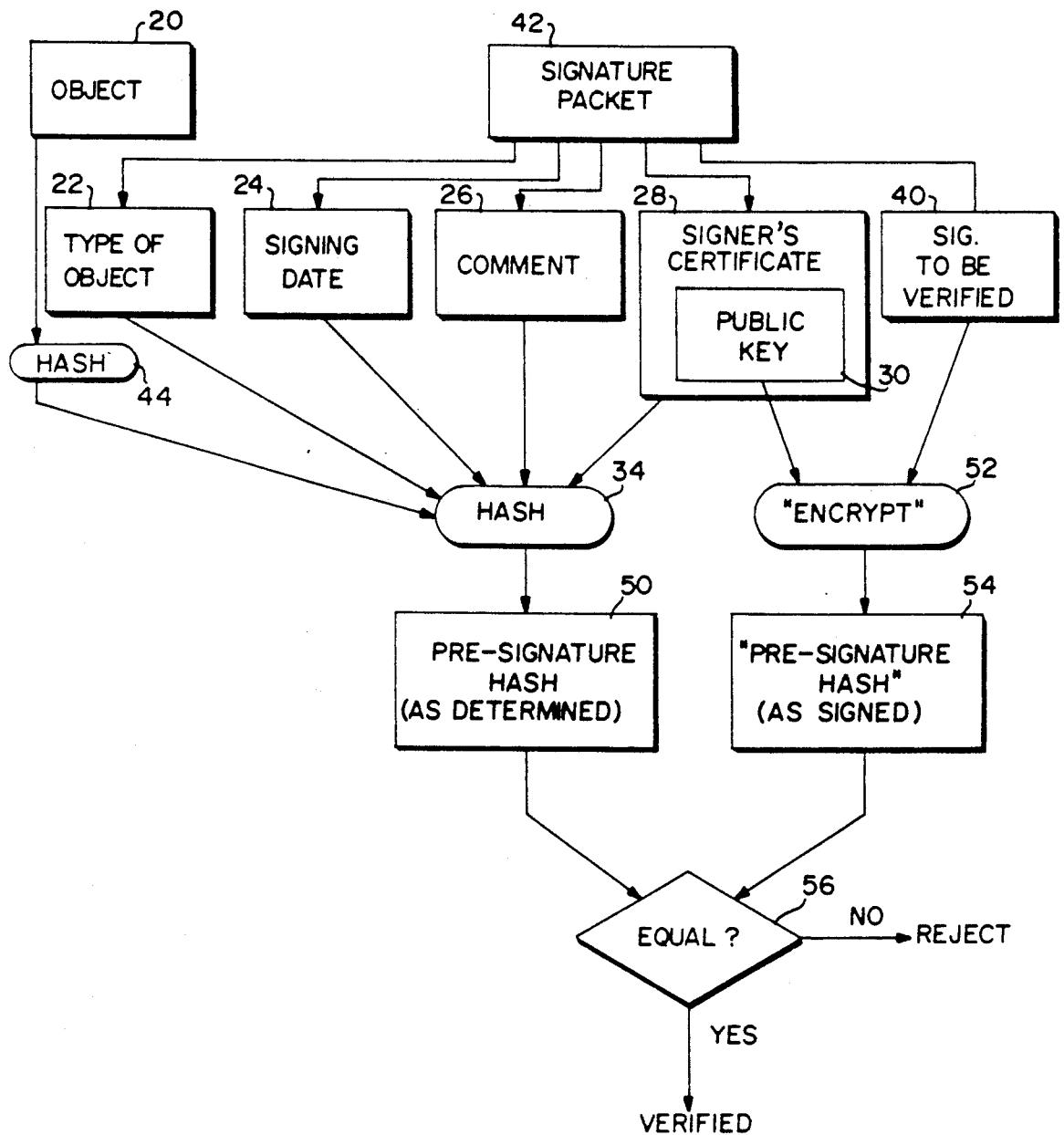
FIG. 3 is a flow diagram that indicates how a digital signature created in accordance with FIG. 2 is verified.

Turning now to FIG. 3, this figure shows how a recipient of the transmitted message, including the signature packet 42 constructed in accordance with FIG. 2, verifies the signature. As shown in FIG. 3, the recipient utilizes the signature packet 42 and the associated fields 44, 22, 24, 26 and 28 and applies the same hashing algorithm 34 as applied to these same fields in FIG. 2 to thereby result in a presignature hash 50.

The recipient then utilizes the public encrypting key transmitted with the signer's certificate 28 and performs an encrypt (verification) operation 52 on the seal to be verified 40 (which was transmitted with the signature packet) to thereby generate a presignature hash 54. The recipient, by recomputing the presignature hash in the same way as the signer, then compares this value with the encryption (verification) of the signer's signature.

As indicated at block 56, if these two values at 50 and 54 are not equal, the recipient cannot accept the received signature as being valid. Whether intentional or otherwise, the object and/or the signature must have been changed or tampered with in some way since they were signed. By virtue of this verification step, the recipient determines that the digital signal is consistent with the public key that was named.

In this manner, the object and its seal are processed to insure that the object is identical to the data which existed as it was signed by the owner of the public key. This is the first step of an overall validation process.

Other steps in the validation process insure that the public key belongs to the person named in the associated certificate and that the person has the authority stipulated in the certificate. This verification process applies generally to any object even if that object is another signature or a certificate. To complete the validation process, the recipient analyzes the certificates associated with the signature to determine that the proper authority has been conveyed to each certificate through its signatures and the antecedent certificate(s) of these authorizing signatures.

An object may be accompanied by more than one signature. Such cosignatures fall into the category of either a joint signature or a counter signature. A joint signature is simply another signature of an object by a different party. The signature process is no different than that used to create the initial signature as described in conjunction with FIG. 2.

A counter signature is a signature of a signature. Thus, when A signs an object, this signature may itself be thought of as an object. Thus, when C countersigns A's signature, the object C is signing is A's signature itself rather than the original object. The counter signature must therefore occur after the signature being countersigned and reflects approval (or at least recognition) of both the underlying object as well as the fact that A has signed that object. This mechanism allows enforcement of a chain of authority where each higher level approves any commitment made at a lower level. One of the unique aspects of this system is that the certificate A associates with this signature may in fact require that the use of A's signature be accompanied by particular other joint or counter signatures.

Figure 4:
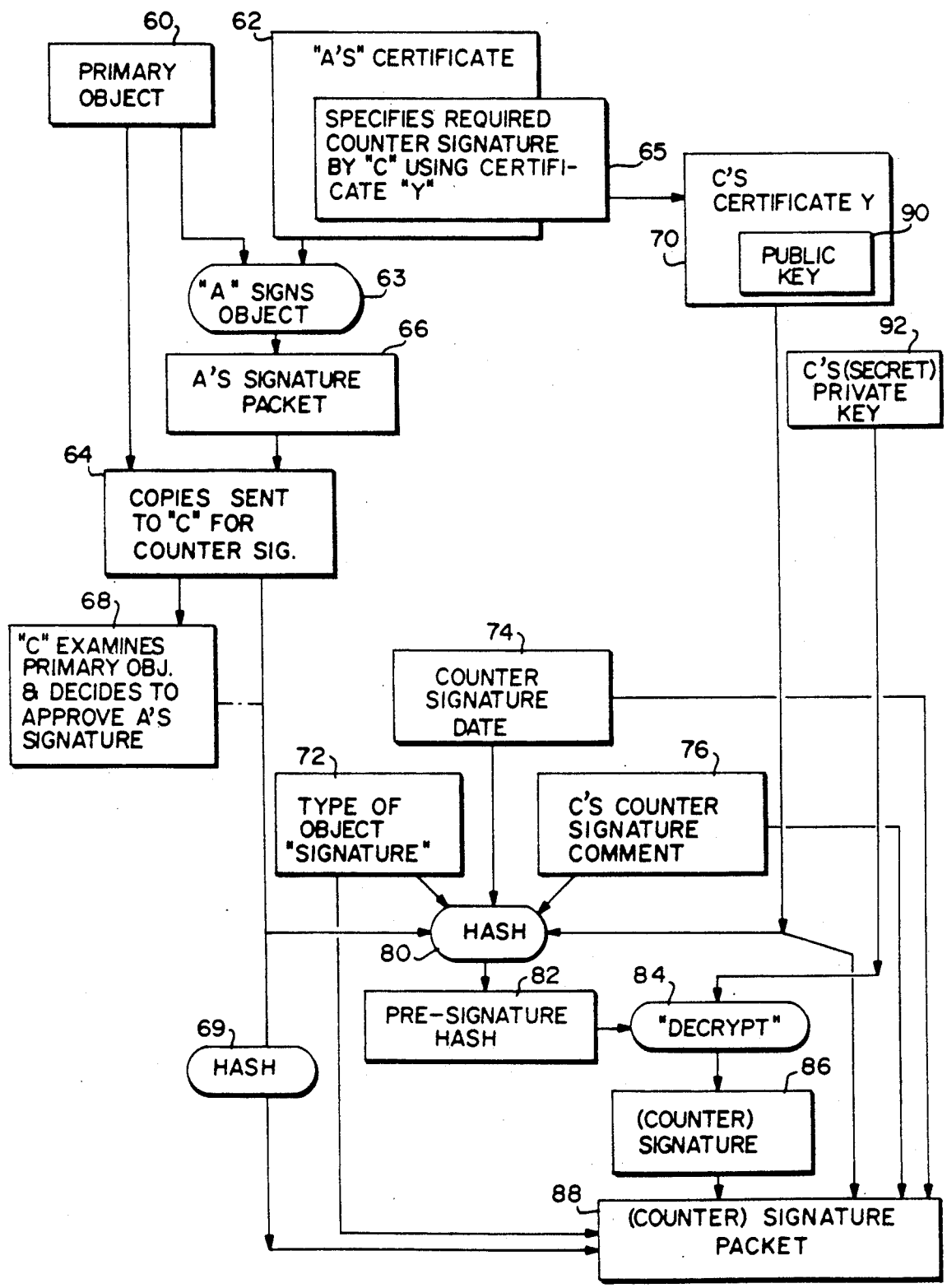
FIG. 4 is a flow diagram that indicates how a countersignature is created for a digital signature.

Turning next to the creation of a counter signature which is shown in FIG. 4, initially A signs at 63 a primary object 60 in accordance with the procedure outlined in detail in conjunction with FIG. 2. The primary object 60 may be a purchase order or some other commitment or it may be a counter signature of some other signature of a primary object.

As explained above in regard to FIG. 2, the process of A signing an object may also involve some other party signing A's signature. Thus, A's certificate 62 specifically defines at 65 that, in order for A's signature to be valid (i.e., ratified), a counter signature by C is required, for example, using C's specific certificate Y.

After A signs the object, A's signature packet 66 is then forwarded along with the primary object and all associated signatures and certificates to C and A requests that C add his counter signature 64. Upon receiving the material, C reviews all existing signature certificates and the primary object and if everything meets with his approval he would decide to sign A's signature 68. A's signature inherently reflects the primary object and C's signature inherently reflects A's signature so C will essentially have "signed on the line below A's signature".

Once C decides to approve A's signature at 68, the process of creating a signature as shown in detail in FIG. 2, is duplicated except that the object is A's signature. Thus, with A's signature as the object (and the type of object being designated as a signature at 72), the counter signature date 74, C's counter signature comment 76, and C's certificate 70 are applied to a hashing algorithm 80 to thereby result in a presignature hash 82. At the same time, these fields are also inserted into the counter signature packet 88 as discussed above with respect to the signature packet 42 (with a hashing algorithm 69 being applied to the signature object).

Presignature hash 82 and C's secret key 92 are applied in a signature operation 84 to generate a counter signature seal 86. This counter signature seal becomes part of the counter signature packet 88 in precisely the same fashion as described previously in regard to the creation of signature packet 42 in FIG. 2.

Because the certificate "Y" which C must use to perform the signature has been explicitly stated (in the certificate which A used to sign), C may also be required to meet his own cosignature obligations so specified by "Y" and forward this entire package including his own newly added signature on to other parties for further cosignatures (either joint or counter signatures). This recursive signature gathering process continues until sufficient signatures are added to fully satisfy all cosignature requirements of at least one party who initially signed the primary object.

Turning next to how one party creates an authorizing certificate for another, it is noted that B creates an authorizing certificate for A by combining a specification of A's identity together with the public encrypting key which A generated for himself. Additionally B specifies the authority capabilities and limitations which B wishes to grant A. By signing the certificate B explicitly assumes responsibility for A's identity and authority.

The present invention permits B to specify other signators who are required to cosign actions taken by A when using the certification. As noted above, B can further define in the certificate for A the degree to which B will recognize subcertifications performed by A.

Additionally, many other limitations and restrictions may be imposed by B. For example, B may impose a money limit which will insure that any recipient of A's certificate will be aware of the limit B is willing to authorize. Since the process of creating a certificate, as will be shown below involves signatures, the use of cosignatures is extended to permit certification authorization. For example, certificates may be designed to allow delegation of subcertification, but only if particular multiple cosigners are involved. This allows checks and balances to be structured into a hierarchy of authority so that electronic digital signatures can be used across organization and institutional boundaries with great confidence— both by the parties receiving the signatures and the parties granting the authority to use the signatures.

The manner in which a party B creates a certificate for party A is shown in FIG. 5. As indicated at 100, A creates a public/private key pair in accordance with conventional public key signature systems and supplies the public key to B 102. Once B obtains the public key provided by A for certification, it is important for B to insure that the public key is actually one generated by A and not someone masquerading as A. In this regard, it may be desirable for the public key generated by A to be provided on a face to face basis.

Having selected his own certificate with which to sign A's certificate, B at 106 utilizes the certificate 108 with the associated public key 110 to create a signature of a new certificate 112. As in FIG. 2, the signature is created using an object (A's certificate 116) and a certificate (B's certificate 108). B's secret private key is utilized in the decrypt operation to create the signature 112 of the new certificate 116 and the signature packet 114 of B's signature becomes part of A's new certificate packet.

Focusing on the certificate for A which is constructed using information about A specified by B, B builds the certificate by utilizing the public aspect of A's public key as provided by A via line 103. B also sets forth A's full name, A's title and other important statistics such as his address, and telephone number. B may also include a comment to go with the certification which will be available to any person in the future who needs to examine A's certificate.

B additionally will indicate an expiration date of the certificate. This date may reflect the date after which A should not use the certificate. Alternatively, the date may call for any certificate created by A to also expire on this date. B may also indicate in the certificate an account number for A which may represent an internal identification code within B's organization.

Additionally, B may place a monetary limit in the certificate. This monetary authority or credit limit is checked against the limit in B's own certificate to insure that B does not delegate more than he is empowered to delegate. This same relationship is also verified by future recipients as part of their validation process.

As discussed above, B also defines the degree of responsibility to which B is willing is assume for subcertifications done by A. This field must be compatible with the trust level which is allowed B's own certificate. The relationship between the trust level granted to B and that granted by B is another of the relationships validated whenever future recipients validate the hierarchy of certificates which are presented to them. As noted above, one or more of the trust levels may carry an associated authority to cancel certificates. Alternatively, a separate trust level may be provided for certificate cancellation authority. Additionally, as indicated above, a security level field may be utilized to incorporate levels of security clearance into the certificates.

B inserts cosignature requirements into A's certificate which specify how many and what type of cosignatures are required to accompany A's signature whenever A uses this new certificate. As indicated above, cosignatures may be in the form of joint signatures and/or counter signatures. The counter signature indicates an approval of the use of the certificate and the approval necessarily follows the associated signature. Joint signatures can be done in any order and do not necessarily reflect approval of the other signatures, but simply approval (or recognition) of a common object.

Cosignature requirements may, for example, be specified in the certificate in a variety of ways. One technique which may be used is to explicitly define a list of valid joint signers and a list of valid counter signers by their public key, or certificate identification. Associated with each list is the number specifying the minimum associated signatures which must be present in order for a recipient to recognize the signature as being fully approved, this could range from 1 to all. The joint signature list may be a vector of hash values of each of the set of other public keys or specific certificates. Some specified minimum number of these keys must appear in certificates of other signatures applied to any object signed by A when using this new certificate. Otherwise any recipient should not treat A's signature as valid.

The counter signature list may be a vector of hash values of other public key certificates which must be used to sign any signature made under the authority of this certificate. References to certificates (rather than public keys), make it possible to force use of specific certificates which themselves need further joint or counter signing. By selecting appropriate certificates to appear here, it is possible to create hierarchy of counter signature requirements to whatever a level an organization feels comfortable. A specified number of cosigners is required from each category. This can range from all the candidates to some subset, for example, 0, 1, 2 or 3 or all.

The set of possible co-signers may be indicated explicitly in a list as described here, or implicitly by specifying some quality or attribute specification which is designated in each possible co-signer's certificate.

B additionally incorporates his own public key has into the certificate which identifies B as the primary sponsor of A's certificate. As the creator of A's certificate, it is contemplated that B will have the authority to cancel A's certificate. B may also designate other parties who may sign A's certificate to grant various types of authority to A.

Other fields may be included in the certificate. For example, the current date and time which reflects the moment of the initial creation of the certificate. As indicated in FIG. 5, the complete certificate consists of a certificate packet with includes the certificate 116 for A and the signature packet 114 of B's signature to A's certificate.

B's signature and the hierarchy of all certificates and signatures which validate it are kept by A and sent along whenever A uses his certificate. It is contemplated that B or other parties may create several certificates for A. For example, one certificate might allow A to reliably identify himself with no further designated authority. Another certificate might allow authorization to A of certain limited money amounts without requiring any cosignatures. A third might allow authorization for larger amounts but require one or more cosignatures. Still another might allow A to subcertify other persons according to still different money and/or authority limitations and/ or co-signature specifications.

Assuming that B has created a certificate for A as shown in FIG. 5, if B requires no cosigners then the certificate is complete. However, the certificate which empowered B to create A's certificate may have required that B have cosigners. There may be one or more joint signature and/or counter signature requirements.

Figure 6:
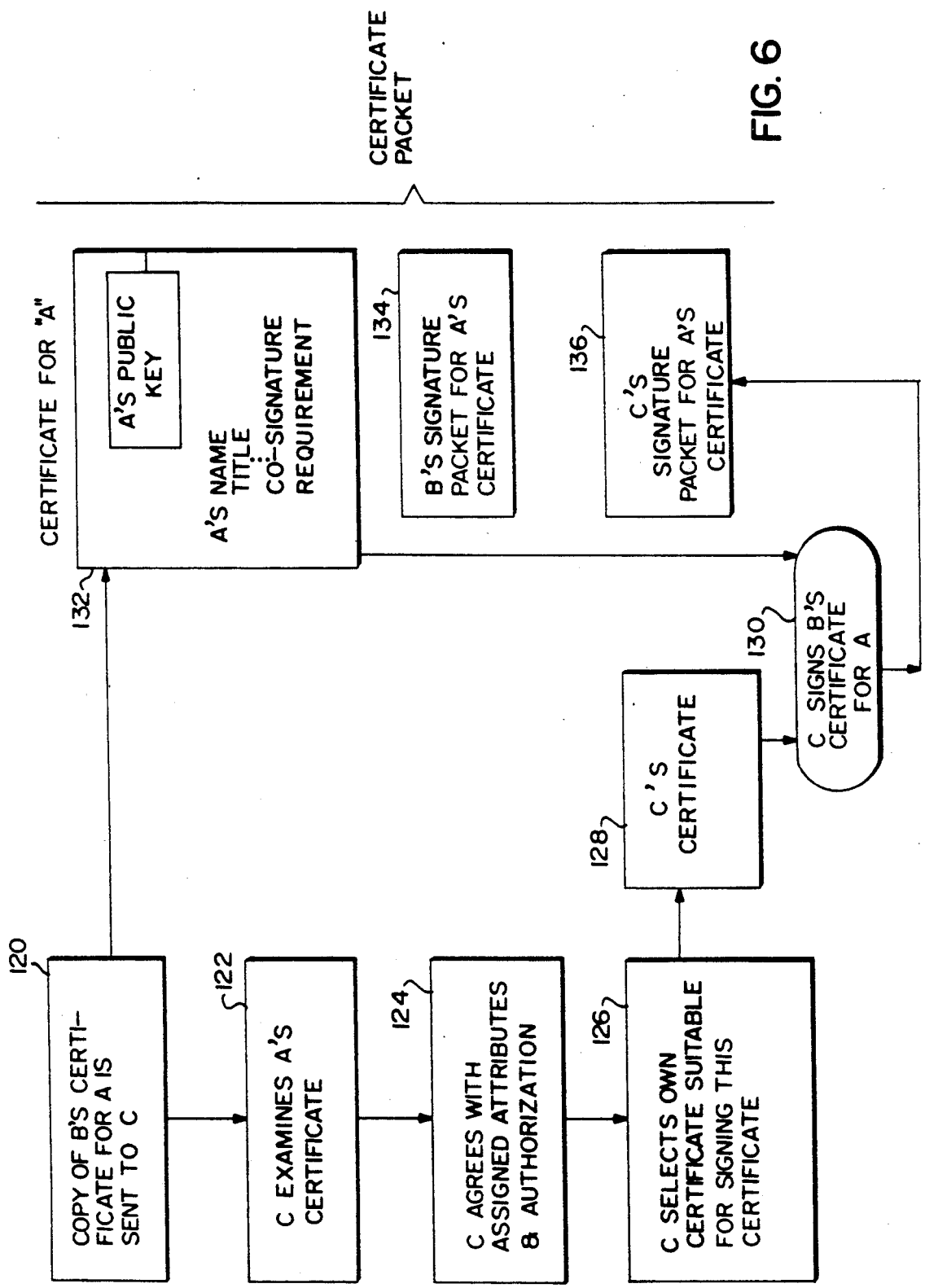
FIG. 6 is a flow diagram that indicates how a joint signature is added to a certificate.

FIG. 6 exemplifies the steps taken by party C to jointly certify the certificate of A. The requirement to have a joint signer would be specified in B's own certificate. In this case, a transmitted object (in this case A's new certificate) signed with B's certificate would be rejected by a recipient if C's joint signature is not also present on the object.

As shown in FIG. 6, if such a joint signature is required, a copy of B's certificate for A is sent (120) to C who must jointly sign the certificate (132). C then (122) examines A's certificate and verifies that the public key of the certificate actually belongs to A in accordance with process outlined in conjunction with FIG. 3.

C then examines the signed attributes and authorizations set forth in the certificate including the assigned monetary level, trust level, etc. C then, upon concluding that all the fields in B's certificate for A are appropriate, selects his own certificate with which to perform the signature 126. With his own certificate 128, C signs B's certificate of A 132 (130). Once C signs his certificate his signature appears essentially parallel with B's signature and any other cosigners as shown at 134 and 136 of FIG. 6. Thus, it is important that C exercise as much caution as B when approving A's certificate. Once A's certificate is created no cosigner may change the certificate for to do so would create essentially a different object to which none of the previous signatures would apply. If C does not approve the certificate he must avoid signing it, and should have a different certificate constructed and re-signed by all necessary parties. After C adds his joint certificate to B's certificate of A, A's certificate packet consists of the certificate for A 132, B's signature packet for A's certificate 134 and finally C's signature packet for A's certificate 136.

In regard to C's signature packet, it is noted that, in order for C to validly sign the certificate, he must select one of his own certificates which grants him sufficient authority to cover whichever aspects of A's certificate C is authorizing. If C has no such certificate, then it is impossible for him to validly sign the certificate since future recipients would reject his certificate as having insufficient authority.

It is noted that C's certificate may also require a counter signature by another party. If so, C forwards the certificate and all associated signatures to the specified party, e.g., D, to counter sign C's signature. When D receives the material he performs the same verification steps as C on the new certificate. If he approves, then D adds his signature to the set. However, D signs C's signature rather then the original certificate object. That is, the object of D's signature is not the object of C's signature (which in this case was the certificate for A) but rather the object is C's signature itself. This counter signature therefore differs from the joint signature which is simply another signature of the same object.

The application of joint and/or counter signatures can be nested to whatever depth is required. Thus, if D is required to have joint signatures, then this package should be passed to one of D's candidate joint signers for approval of C's signature. This would be a joint counter signature. Similarly, in organizational hierarchies it is possible that D might require counter signatures in which case someone else will need to sign D's signature.

As explained above, the recipient of a primary object (such as a purchase order) and its associated signatures, processes the received materials to insure that the object is identical to the material which existed as it was signed by the owner of the public key. The process for verifying the signature and for verifying that the object had not been tampered with has been explained above in regard to FIG. 3.

Additionally, the recipient needs to verify that the identity of the signer is correct and further that the signer has the proper authority within his organization to make the commitments implied by the received object. The sender of the object (e.g., the purchase order) has the responsibility of sending all generations of antecedent certificates and signatures (up to and including the meta-certificate) which are needed for a recipient to perform validation operations.

In validating the object and its signatures, the recipient may, for example proceed as follows. First the recipient insures that the primary object 150 has at least one signature. In the example shown in FIG. 7, the primary object 150 has four associated joint signatures 152, 168, 180 and 200, each of which has associated certificates 154, 170, 182 and 202 respectively.

Certificate 154 was made requiring joint signatures by the owners of certificates 170, 182 and 202, and counter-signatures by the owners of certificates 162 and 166 using these specific certificates. The certificate 154 itself was authorized by the owner of certificate 158 as evidenced by signature 156.

In this example, the owner of 154 has obtained the necessary counter signatures 160 and 164 by the holders of certificates 162 and 166, as well as the necessary joint-signatures 168, 180 and 200.

To provide validation for his signature 168, the owner of certificate 170 must include the authorization for his certificate. His certificate was signed by the holder of certificate 174 (as evidenced by 172), however 174's certificate specified that a joint signature by the owner of 178 was required in order to fully ratify 174's signature 172. Thus signature 176 which was made sometime in the past, fulfilled all of 174's joint signature requirements and thereby validated (ratified) the use of 170.

Looking at joint signature 180, by the owner of 182, we learn that 182 requires counter signatures by the holder of 186 using the specific certificate 186. The holder of 182, did in fact get the counter-signature 184 by the holder of 186. However, certificate 186 requires that any signature by 186 itself be countersigned by the holders of certificates 190 and 194 (using these respective certificates). These two holders have in fact countersigned 184 as evidenced by 188 and 192. At one further level we learn that certificate 194 requires any signature by 194 be counter signed by the holder of certificate 198, which signature 196 has been obtained. Certificate 202 requires no co-signature.

All certificates must be accompanied by signatures which are themselves authorized by antecedent certificates. Ultimately all the authority can be traced to a set of certificates which have been signed by the holder of the meta-certificate (or possibly a small set of meta-certificates). Each meta-certificate is well known and distributed to all parties "throughout the world".

The recipient examines every signature supplied and verifies that each accurately signs its purported object (whether the object is a primary object, a certificate, or another signature) using the procedure detailed in FIG. 3. The recipient insures that each signature includes a corresponding validated certificate.

If a certificate requires joint signatures, then the recipient insures that the required number of these necessary signatures (to the same object) are present. If the certificate requires counter signatures, then the recipient insures that the required number from the designated subset are present (the counter signatures have signatures as their object).

All certificates are then examined. A check is made for the special meta-certificate which has no signature but which is universally known and trusted and a copy of which is already stored in the recipient's computer. If a certificate is received which claims to be the meta-certificate but which is not equal to that already known to and accepted by the recipient, then a rejection is issued. If the meta-certificate is properly recognized, then the validation process continues.

Additionally, a check is made to insure that all certificates except the meta-certificate have at least one signature. As noted above, a check is made to insure that all necessary cosignatures for all presented objects are present. Additionally, a check is made to determine that antecedent certificates grant sufficient authority to the subcertificate signers to permit them to validly sign the certificate.

In this regard, the trust value in the certificate must be consistent with the antecedent (i.e., the certificate of its signers). By way of example only, the following trust field combinations are valid (using the example specified earlier).

| Immediate Trust Value | Trust Value and Antecedent (Sponsor's) Certificate |
| --- | --- |
| 0 | 1 |
| 0 | 2 |
| 0 | 3 |
| 1 | 2 |
| 1 | 3 |
| 2 | 2 |

| Immediate Trust Value | Trust Value and Antecedent (Sponsor's) Certificate |
|---|---|
| 2 | 3 |

Additionally, any monetary limitations set forth in the certificate must be observed. The money limit allowed by a certificate must not exceed its antecedent. Additionally a check should be made to insure that each certificate's expiration date is compatible with its antecedent's expiration date. By way of example only, a check may be made to insure that the expiration date in every certificate exceeds the date of each signature which relies on it. In some cases, it may be desirable to reject any material which is controlled by an obsolete certificate.

In order to detect "closed" authority loops (by which a series of certificates may be falsely structured in a loop with the last member of the loop granting authority to the first), it is necessary to insure that all authority ultimately flows from recognized meta-certificates. In this manner, a chain of false or artificial certificates which mutually certify each other will not be inadvertently allowed to incorrectly pass the validation process.

One way to accomplish this is to check off certificates in a series of iterations, starting at the top with the meta-certificate. At each iteration, certificates are scanned and in the process certificates having at least one checked off antecedent would in turn be verified. If all necessary authority is granted by antecedent certificates which are already fully "checked-off", (including consideration for valid joint and counter signature requirements), then this certificate is considered checked off. The iteration stops when no new certificates have been checked off. If any certificates have not been checked off, then these are "orphans" which should never have been supplied and they are ignored.

Once the signatures and certificates are validated (based on the ultimate authority of the meta-certificate(s)), the final step is to insure that the commitment inherent in the primary object is within the authority granted to its immediate (checked-off) (joint) signers. This is done by considering the value imputed to the primary object with the certificates of its signers.

Although the use of a meta-certifier insures that all authority ultimately flows from a trusted source and provides protection, the present invention is not limited to a certification methodology which necessarily includes a single meta-certifier. It is contemplated by the present invention to allow for the use of multiple meta-certifiers. These should be certificates governed by entirely independent sources possibly reflecting the apex of entirely different authorizing hierarchies (e.g., the governmental sector versus the private sector).

Note that each user should at some time "accept" each meta-certificate, by signaling recognition to the computer system, in some way, so that the user's trust is recognized. One way to do this is for the user to keep an encrypted or signed copy of each meta certificate (or hash thereof).

Another use of multiple meta-certifiers could be to avoid concentrating full meta-certification responsibility with one group. For example, it might be uncomfortable to know that there is a single entity which could in theory create forgeries on behalf of anyone else by creating false certificates. This concern may be alleviated if the meta-certification authority were distributed among different trusted meta-certifiers. Each meta-certifier would operate completely independently but each certificate would specifically require the others as joint signers. This would essentially eliminate the possibility that isolated corruption within a single organization would compromise the system. For example, any organization that wished to be certified would need to have their own high level master certificate corroborated by each separate entity. Large organizations may likewise wish to structure their own master certificates to be constructed so as to require joint signatures in order to provide multiple safeguards against the danger of isolated corruption within the organization.

FIG. 8 shows an exemplary memorandum to be electronically transmitted from one party to another as a digital document. The party transmitting the document, after generating the message portion of the communication (shown above the "Digital Signature" portion) hits a control key on the keyboard/CRT 4 shown in FIG. 1 to provide a digital signature and summary of the certificates governing the digital signature (examples of which are shown in FIG. 8).

The digital signature shown in FIG. 8 may be created as described above in conjunction with FIG. 2. The signature and seal which consists of a lengthy string of hexadecimal data incorporates data such as the hash of the object, type of object, signing date, seal, etc., as will be described further below in conjunction with FIG. 9.

Additionally, FIG. 8 includes a summary of the certificates governing the digital signature which identifies the certificate which was used to create the digital signature, as set forth in block 28 of FIG. 2. The summary of the certificate information includes data extracted from the certificate, such as the certificate I.D., which uniquely identifies the certificate by a 32 hexadecimal digit. The 32 hexadecimal digits in the certificate I.D. is the hash of the data in the certificate and therefore uniquely represents the certificate. Thus, no two certificates will ever have the same I.D.

Additionally, the summary data includes the certification date, and, for example, the authorized money limit that the certified party has the authority to deal with. If desired, security level and trust level data may also be included in the summary data. The summary data may include any or all of the data set forth above in block 116 of FIG. 5.

Upon receipt in the computer file of the recipient, the digital signature and certificates are validated in accordance with the procedures described in detail above in conjunction with FIGS. 3 and 7. In this regard, it is noted that the letter shown in FIG. 8 would not be printed until the above-described validation procedures determine that, for example, it is valid, properly authorized and authenticated.

A further enhancement to digital signatures provided by the present invention is that for objects which are subject to be printed, a "white-space-hash" is computed. As will be described further below, this white-space-hash becomes part of the signature, which is hashed together with the object, hash of the object, the type of the object, and optional comments and which becomes part of the digital signature that is ultimately processed with the signer's private key to create a seal.

Many documents which are transmitted digitally, are ultimately printed such as the memorandum shown in FIG. 8. If such a document has been computer generated and digitally signed then there may be a future need to allow for signature and document validation, even after the document is no longer stored within a computer memory.

There are several problems in verifying such a digital signature which has been printed. Simply reentering the document into a computer and recomputing the validation signature hash "fingerprint" is unlikely to work for many reasons. For example, the original computer document is likely to contain tabs, blanks, carriage control characters and other non-printable control characters which cannot be ascertained from the printed output alone. Since the digital signature is based on the exact bit for bit image of the original computer file, in most cases it is essentially impossible to ever retype the document bit for bit as it was originally generated. Even if a user could get the printout to look the same as the original, the original probably will contain a slightly different mixture of tabs, spaces, or other control characters.

The present invention remedies this problem by employing a methodology for digitally signing documents in which signatures are generated for both computer verification and for possible emergency reverification if a document ever needs to be reconfirmed by reentering it from a paper rendition. In accordance with the present invention, digital signatures for document type computer messages embody two distinct types of hash values. The first hash value relates to the exact bit for bit data in the file and is used to provide a digital signature as described above. This allows for validation of the exact original document as long as it is accessible in computer readable form.

Additionally, a second auxiliary hash value is taken across the same data in the file except that the data used for the second hash value is "white-space-normalized" in the manner described below. This white space normalization allows the data to be reentered from a printout at some future time without having to account for what kind of unprintable, unseen control characters may have existed on the original document. By including in the digital signature a white-space-normalized hash value, a printed version of an original document may later be verified as being genuine.

In this regard, a white space hash value is calculated for the retrieved document and this calculated value is compared with the digital signature and seal data. If the stored White-space-hash value matches the calculated value, the document is verified as being genuine.

There are numerous ways a document could be "normalized" of which the algorithm described below is exemplary.

Before describing how the white-space-hash is computed, it is noted that the letter shown in FIG. 8 and other similarly generated documents are typically stored as an ASCII file. Such a file incorporates carriage control characters, tabs and other control characters. The hash value generated from such a computer file is a function of each bit in such a computer file. Thus, a different hash value will be created if, for example, a single control character is modified.

Figure 9A:
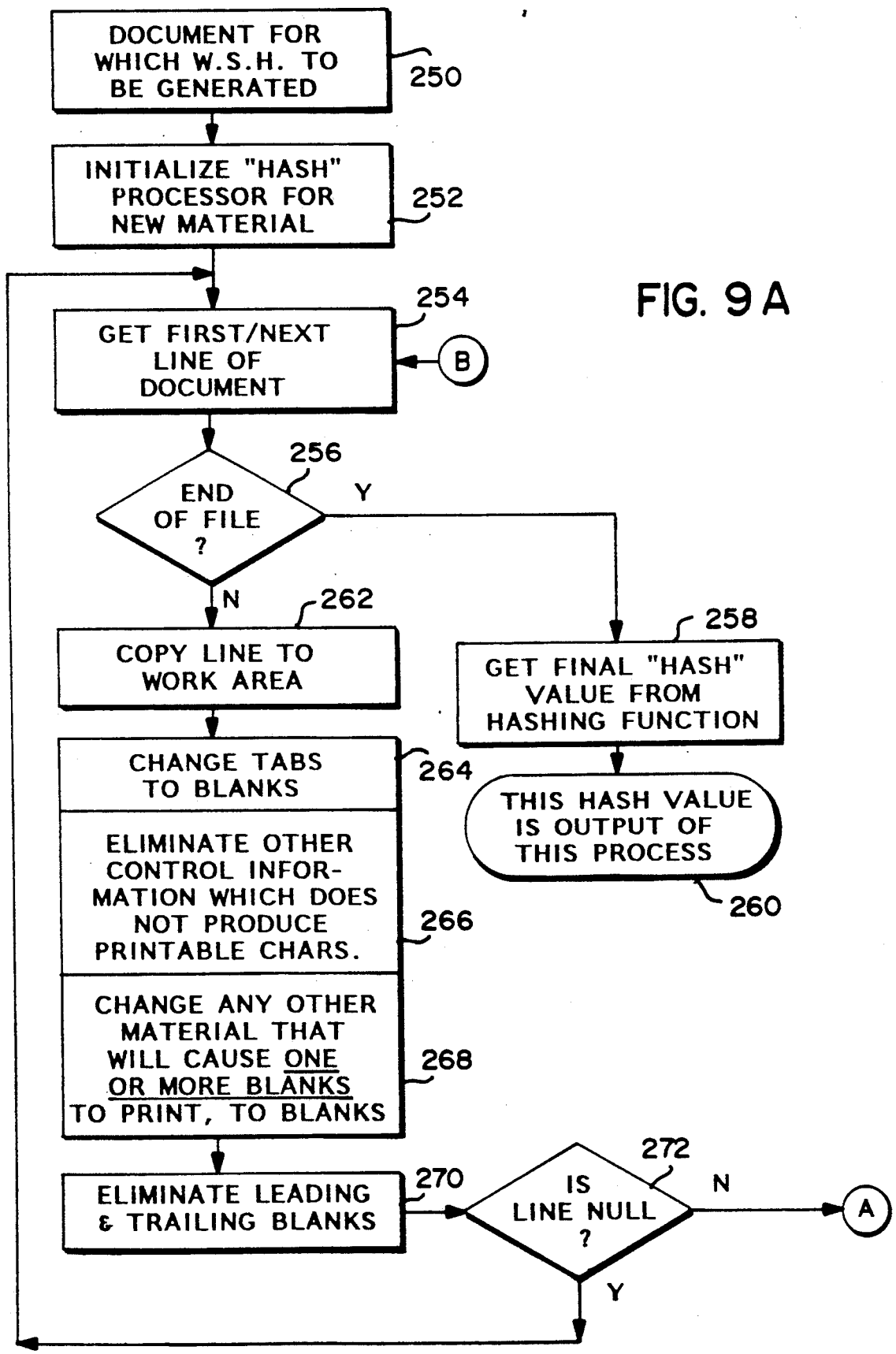
FIGS. 9A and 9B is a flowchart showing the processing associated with computing the white-space hash function.

The white space hash function described below in conjunction with FIGS. 9A and 9B, permits the recipient of a digital document to verify the genuineness of the digital document whether the recipient has only the printed document itself or the the transmitted computer files. Turning to FIG. 9A, the white space hash is computed by first inputting the document for which the white space hash is to be generated (250). The white space hash processing routine is initialized to create the hash for the new material (252). In this regard, all registers associated with creating the white space hash are cleared.

Thereafter, the document which has been entered is broken into lines in accordance with the manner in which it is to be printed. This is typically done by examining the carrier return and/or line feed characters. After the document is broken into lines, the first (or next) line of the document is retrieved (254).

After retrieving the first line, a loop is entered for processing the line and an initial check is made to determine whether the end of the file has been reached (256). If the end of file has been reached, as determined by the check at block 256, then the final hash value is retrieved from a hashing function processing routine (258). This final hash value is then utilized as part of the digital signature as will be explained further below. (260).

If the check at block 256 reveals that the end of file has not been reached, then the retrieved line is moved to a work area in memory (262). In the memory work area, all tab characters are changed into space or blank characters (264). Thereafter, all other control information is eliminated which does not produce a printable character (266). In this regard, all remaining control information such as information used for setting fonts, styles, underscores, italics, etc., are removed. Any control information which would give rise to one or more blank characters are replaced by a space (268). Thus, multiple blanks which appear in a line are replaced by a single blank. In this fashion, the document is reduced to the underlying character set which is typically in ASCII.

Thereafter, the beginning and ending portions of the line are checked and all leading blanks and trailing blanks are eliminated (270). A check is then made to determine whether a line is totally blank (272). If so, the totally blank line is eliminated and the routine branches back to block 254 to retrieve the next line of the document.

Figure 9B:
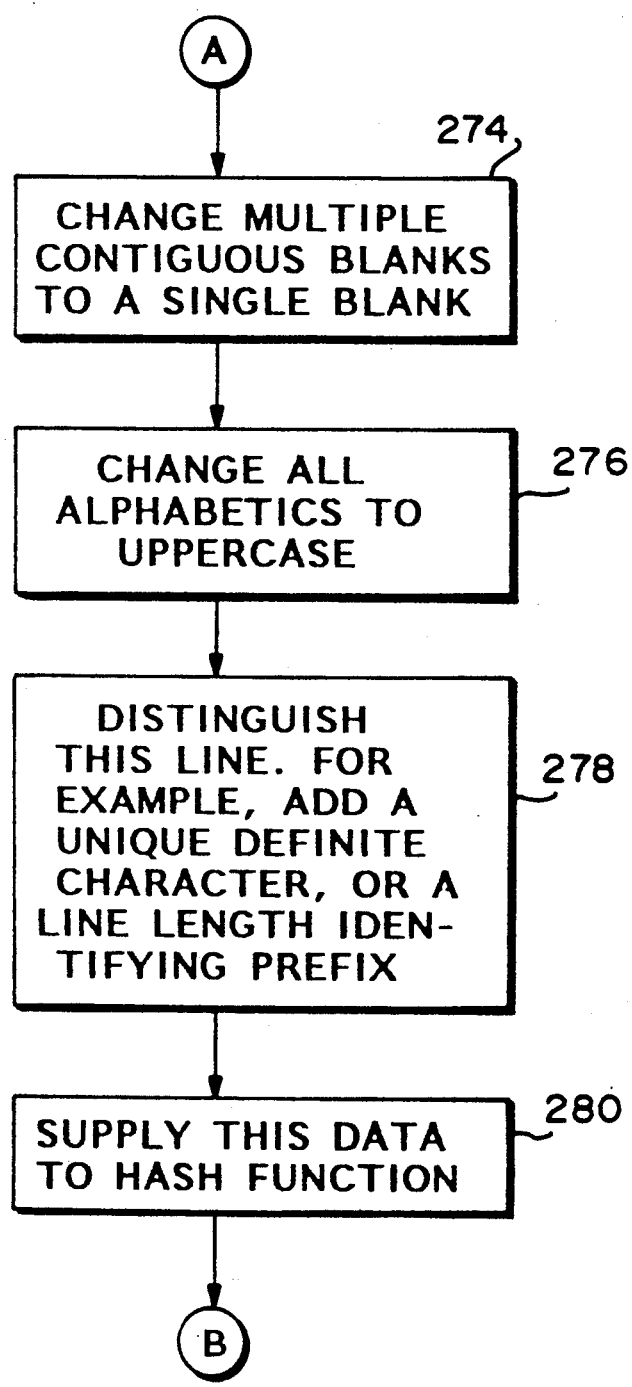

If the line is not an entirely blank line, as indicated in FIG. 9B, any multiple contiguous blanks are changed to a single blank (274). Furthermore, since some printers only print uppercase characters, all remaining characters are changed to uppercase (276). This step is utilized to standardize the processing since, as noted, some printers only print uppercase. It would be possible to omit this step if all recipient printers supported mixed case.

Thereafter, a delimiting character is utilized to uniquely and unambiguously identify the end of a line so that the lines are kept distinct (278). For example, a special character, such as a new line character could be reinserted to separate the now normalized lines. The control character used should be a character which would never appear in the text of the document. Alternatively, a prefix could be utilized in front of the line to identify the length of the revised line. The revised line, processed as described above, is then supplied as data to the hashing function processing routine (280) which determines a hash value as described above which unambiguously identifies the line of text.

Thereafter, the next line of the document is retrieved at block 254 until ultimately the end of file if reached as determined at block 256. After the entire document has been processed, the resulting final hash value is a white-space-normalized hash value of the document which is utilized as part of the digital signature as will be described further below.

Figure 10:
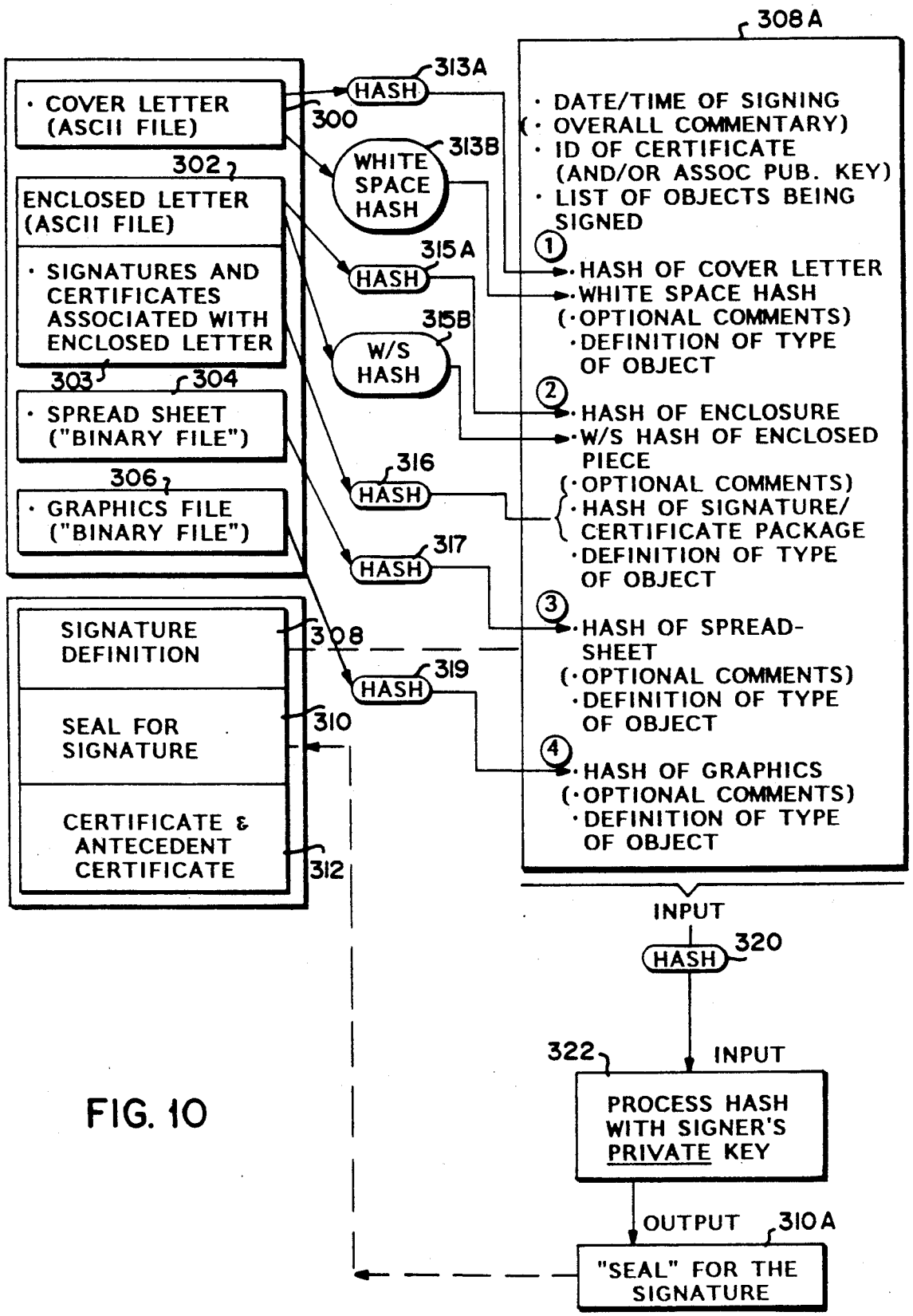
FIG. 10 show how a multiple document package is signed in accordance with the present invention.

FIG. 10 is an example of how the computed whitespace-hash is utilized in a digital signature. FIG. 10 additionally exemplifies how multiple documents and/or files are signed as a group in accordance with the present invention.

A "multiple document", as shown in FIG. 10, includes a plurality of associated but distinct objects such as, for example, a cover letter 300, an enclosed letter 302, (having associated signature and certificates 303), a spread sheet 304 and a graphics file 306. The enclosed letter 302 may, for example, be a letter which is being forwarded to the recipient which is mentioned in the cover letter 100.

This digital package is signed with a digital signature 308, and, as described above, includes a seal 310 associated with the digital signature. Also included in the digital package are the certificate and antecedent certificates 312 which enable a recipient to prove to his satisfaction that the signature is valid and properly authorized as described in detailed above.

The data structure shown at 308A in FIG. 10 is a blowup of the signature definition 308 that is transmitted with the digital package. This data structure 308A is then run through a hashing function 320. The output from the hash function 320 is then processed with the signer's private key (322). The output of block 322 is the seal for the digital signature as indicated at 310A and is incorporated in the digital package to be transmitted at 310.

As shown in FIG. 8, the data representing the signature and seal is printed on the bottom portion of the transmitted digital package in hexadecimal or octal representation. It is preferred that this information contain checksums or other error detecting and/or correcting codes so that any data miskeying can be readily detected. By including, as noted above, the digital signatures as part of the digital printout of the package, the printed document may be reverified as will be explained further below using the white space hash value.

Additionally, give the aggregate signature list, any particular document can be verified as having been signed, and its context among the other documents will be obvious, even if all the documents are not available.

Turning back to FIG. 10, as indicated above an expanded version of the signature definition 308 it shown 308A. As explained above in conjunction with FIG. 2, the signature definition includes data relating to the date and time of signing the digital package as well as overall commentary regarding the package. Additionally, the signature definition includes as described above, the signer's certificate including the I.D. of the authorizing certificate and/or the associated public key.

Thereafter, a list of the objects being signed is incorporated detailing each of the four portions of the digital package described above, (i.e., the cover letter, the enclosed letter, spread sheet and graphics file). Associated with each listed object is a definition of the type of object indicating whether, for example, the object is a purchase order, another signature or certificate, a letter, etc.

Focusing on the list of documents being signed, beginning with the first document (e.g., the cover letter), a hash 313A, 315A, 317, and 319 is computed of each document exactly as it is going to be transmitted. Additionally, a white space hash 313B and 315B is computed for the cover letter and the enclosed letter as described in detail above in conjunction with FIGS. 9A and 9B. Additionally, a hash 316 is taken of the signature and certificates 303 associated with the enclosed letter. It is noted that since the spread sheet 304 and graphics file 306 are binary files, no white space hash is computed for these files.

Having created the seal 310A, utilizing the hashing functions referred to above, the resulting seal could only have created by the data appearing in the signature definition 308A. Accordingly, by working backwards from the seal, the recipient may verify the genuineness of the data contained in the signature definition.

As noted above, the purpose for computing and storing the white space hash is that sometime in the future it may be necessary to reverify or authenticate a digital document, the only copy of which may be a printed version in the recipient's hard copy file. Such a document may be reverified in accordance with flowchart set forth in FIG. 11.

Figure 11:
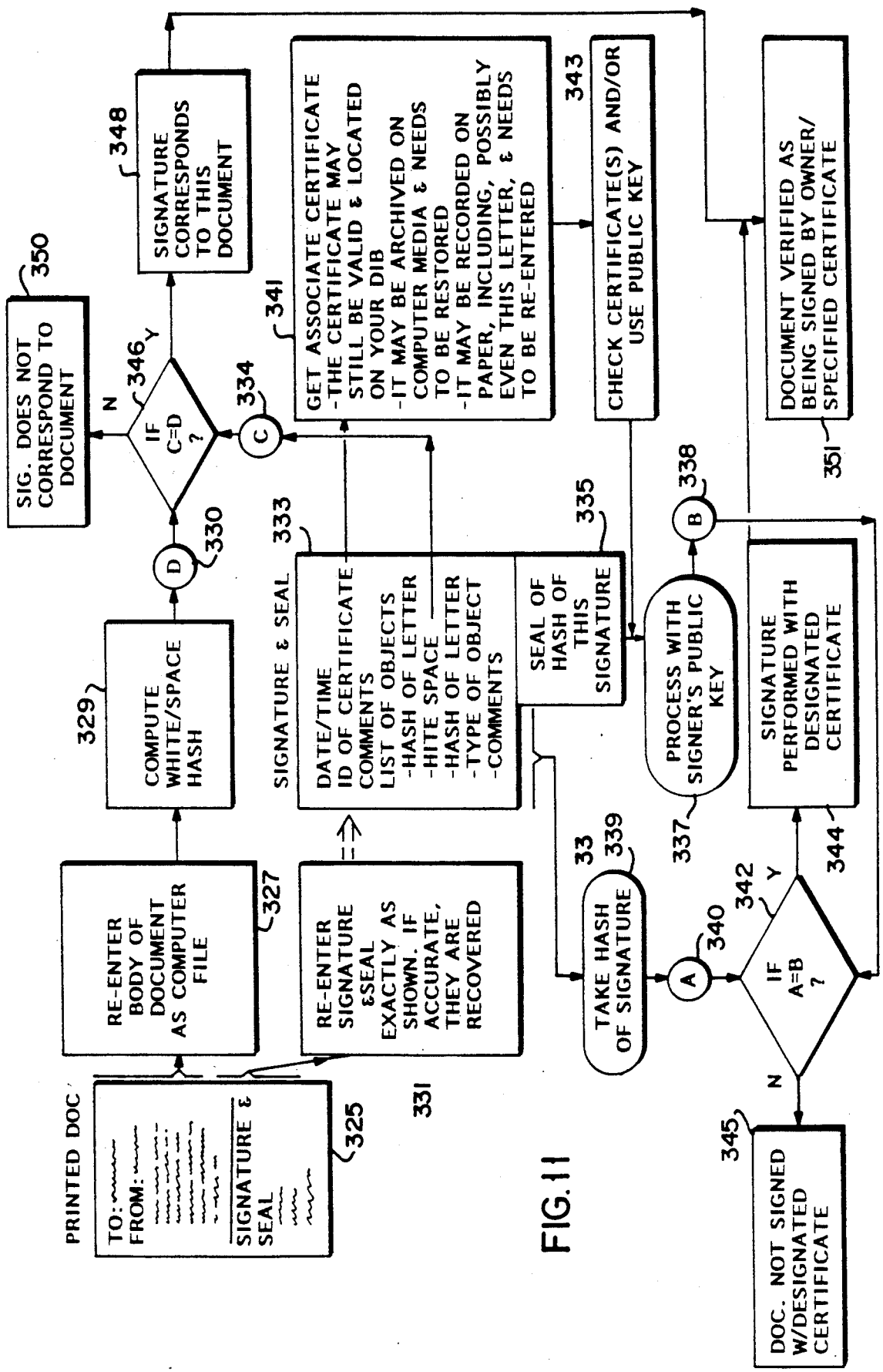
FIG. 11 shows how a printed document may be reverified using the white space hash function.

The printed document 325 represented in FIG. 11 may, for example, be the document shown in FIG. 8. As indicated at block 327, a reverification subroutine prompts the user to re-enter the body of the document and to type it as it appears on the printed document. In this regard, the document need not be entered so as to duplicate the disposition of blanks on the document since the white-space-normalization ignores all multiple blanks.

After the body of the document is entered, the white-space-hash is computed (329) as described above in conjunction with FIGS. 9A and 9B. The white space hash value identified in FIG. 11 is stored as value D (330).

Thereafter, the reverification routine prompts the user to re-enter the signature and seal exactly as shown (331). Since the signature and seal must be entered exactly as shown, it is desirable to use checksums or other error detection/correction codes to determine that the hexadecimal codes have been correctly entered.

It is noted that the re-entered signature and seal are the digital versions of the signature definition and seal shown at 308A and 310A in FIG. 10 (which are represented in FIG. 11 as 333 and 335, respectively). The codes entered at 331 inherently define where the signature portion 333 ends and the seal portion 335 begins.

As indicated at block 339, the hash of the signature portion shown at 333 is taken and the hash value A is stored (340).

Thereafter, the seal of the signature (335) is processed with the signer's public key (337) to generate a hexadecimal value B which is used in the following check (338). If the hash of the signature as indicated by value A, is equal to the value B, then the seal and the signature are verified as being correct. Thus, as indicated by the check at 342, if A equals B, the determination is thereby made that the document was signed with the designated certificate (344). Alternatively, if A does not equal B, then the document was not signed with the designated certificate (345).

The public key utilized in block 337 is obtained from the signature information 333 which identifies the signer's certificate. Using the I.D. of the certificate, the associated certificate is retrieved (341). The associated certificate may still be valid and located in the recipient's data base. Alternatively, it may be archived and need to be restored or it may be recorded on paper and need to be re-entered as indicated at block 341.

As indicated at block 343, a check may then be made to determine whether the certificate I.D. shown on the associated certificate, matches the certificate I.D. identified, for example, in FIG. 8 under the summary of the certificates governing the digital signature. If so, then it is presumed that the associated certificate is a genuine certificate which had been verified by the system as identified above upon receipt of the original document. Alternatively, the certificate could be independently verified by locating and checking all of its antecedents. The public key associated with the certificate was then utilized at block 337 to generate the value B.

Thereafter, the white space hash associated with the signature at 333 and having a value C is stored as indicated at 334. A comparison is then made between values C and D to insure that the document is in fact the object signed. Thus, as indicated at 346, if C is equal to D, then it is determined that the signature corresponds to document 325. If C does not equal D, then the signature does not correspond to the document (350) and the process is aborted. If the signature corresponds to the document 348 and if the signature is performed with the designated certificate 344, then the document is verified as being signed by the owner of the specified certificate 351.

Figure 12:
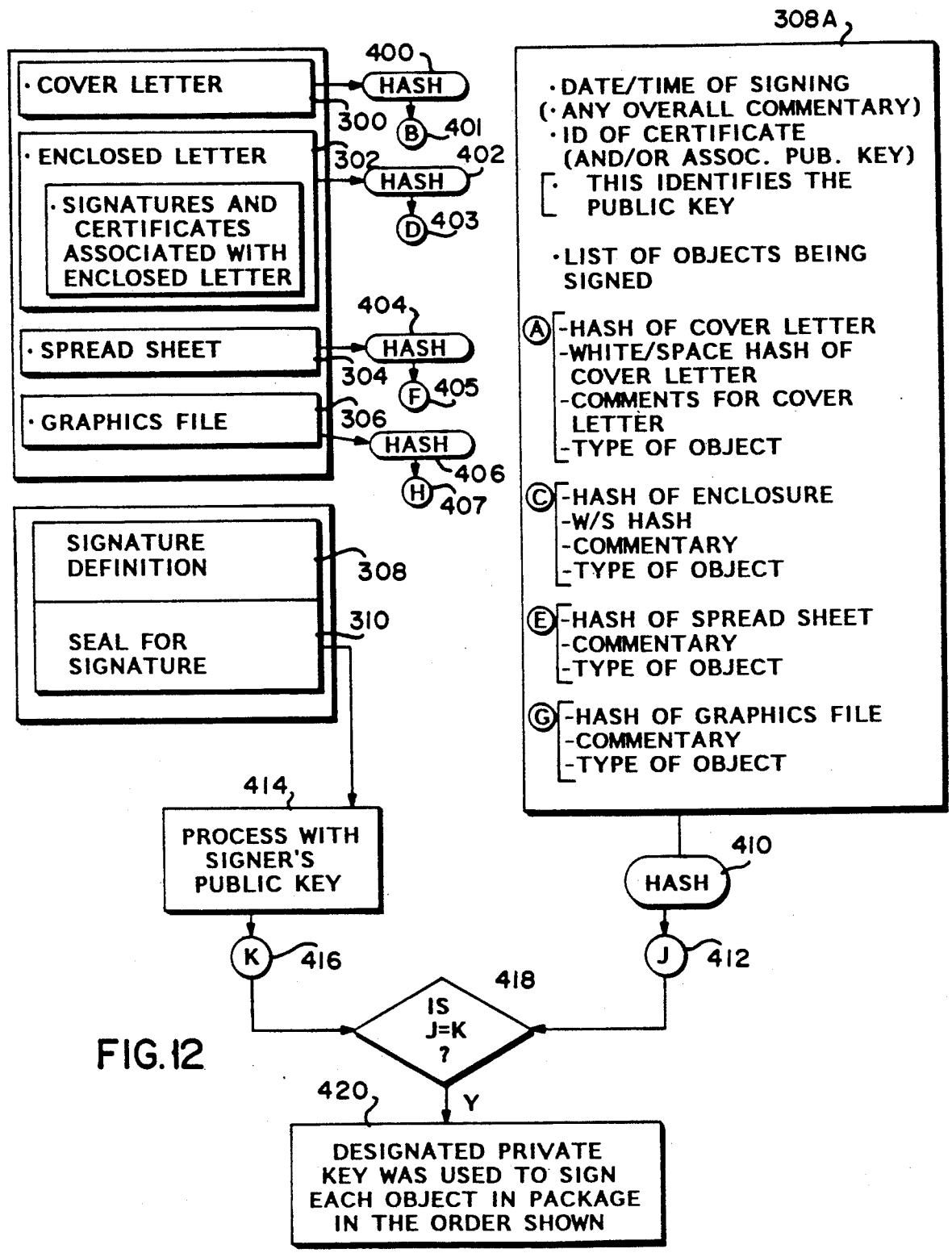
FIG. 12 shows how a signature is verified for a multiple document/file package.

FIG. 12 demonstrates how signatures are verified by a recipient of a document package having a multiple document/file architecture. The received digital signature and seal are checked to insure that they exactly correspond to the document package which contains the cover letter 300, enclosed letter 302, spread sheet 304, graphics file 306, signature definition field 308 and seal for signature field 310 which have been previously described above in conjunction with FIG. 10. In this fashion, it can be determined that the received data was not damaged or lost on route, and that the documents were not forged, or tampered with in any way.

The primary benefits of such a method are two fold:

Each individual object is recognized as a separate entity, and can be separately verified.

The context of each object in the set is recognized, including the order of the objects as part of the package.

Initially, the hash of each of the objects 300, 302, 304, 306 is computed as indicated at 400, 402, 404, and 406, respectively. The hash values B, D, F and H are then stored as indicated at 401, 403, 405, and 407, respectively. Thereafter, the signature definition which is shown in FIG. 12 in blow up form at 308A is checked and signature items A, C, E, G are accessed. Items A, C, E and G represent the hash of the cover letter, the hash of the enclosed letter, the hash of the spread sheet, and the hash of the graphics file, respectively.

To determine that the signature actually reflects the first object, i.e., the cover letter, a comparison is made between the hash of the cover letter in the signature as indicated by item A, and B, the computed hash of the cover letter. If A equals B, then the hash of the cover letter is embodied in the signature. Similar comparisons are made of the value C and D; E and F; and G and H to determine that each of the remaining objects are correctly embodied in the signature. If each of comparisons yield a match, then the body portions of each of 300, 302, 304, and 306 are verified as being accurately reflected by the signature 308.

Thereafter, the signature is checked to insure that it is correct. As indicated at 410, the hash of the signature is computed. The computed value J is then stored (412). Thereafter, the seal 310 of the signature is processed with the signer's public key to obtain a value K which is stored (416).

The value K which is the hash extracted from the signer's public key is checked to determine whether it matches the recomputed hash J. A check is then made to determine whether J equals K as indicated at 418. If J equals K, then the designated private key was, in fact, used to sign each of the objects in the digital package in the order shown and with the comments stipulated (420). Thus, the signature represents the valid digital signature for the package. The signatures and certificates are then checked to insure that they in fact are authorized as described above in conjunction with FIG. 7.

While the invention has been described in connection with what is presently considered to be a practical embodiment, it is to be understood that the invention is not to be limited to the disclosed embodiments, but on the contrary, is intended to cover various modifications and equivalent arrangements included within the spirit and scope of the appended claims.

I claim:

1. In a communication system having a plurality of terminal devices coupled to a channel over which users may exchange messages, at least some of said user's having a public key and an associated private key, a method for controlling authority in a hierarchical manner among a group of users, comprising the steps of:

specifying at least first and second digital authority defining data structures, said data structures having digital values which can be associated with at least one user's private key, said step of specifying including the step of digitally specifying a set of authorities from a sufficient plurality of authorities so that a first user may digitally delegate authorities to second and third users so that the authorities delegated to the second user are different than those delegated to the third user, providing that the first user's digital authority defining data structure allows for such delegation; and digitally signing by the first user the second digital data structure so that signatures performed by the second user's private key associated with the second data structure will be recognized upon an electronic analysis of the digital signature as having been granted said authority by the first user in accordance with the first user's authority-defining data structure.

2. A method according to claim 1, wherein said step of specifying includes the steps of delegating the authority to cancel a digital certificate on behalf of the certifier and to subauthorize authority on behalf of the certifier.

3. A method according to claim 1, wherein said step of specifying includes the step of defining the security or clearance level of the signer of an authority defining data structure.

4. A method according to claim 1, wherein said authority defining data structure defines the cosignature requirements which must accompany the signer's signature.

5. A method according to claim 4, wherein a digital signature by a third party indicating approval of the user's signature is required thereby defining a counter signature requirement.

6. A method according to claim 4, wherein the step of defining cosignature requirements includes the step of specifying at least one other digital signature which is required to appear in the authority defining data structure thereby defining a joint signature requirement.

7. A method according to claim 1, further including the steps of:
creating a hash value of a message to be transmitted based on the exact bit-for-bit data to be transmitted;
creating an auxiliary hash value designed to verify the genuineness of a printed version of the message; and
incorporating both hash values as part of the digital signature.

8. In a communications system for exchanging messages over a communications channel, a method of digitally signing a message to be transmitted comprising the steps of:
creating a digital hash value of the message to be transmitted based on the exact bit-for-bit data to be transmitted;
creating an auxiliary digital hash value to permit subsequent verification of the genuineness of a printed version of the message; and
incorporating both hash values as part of a digital signature.

9. A method according to claim 8, wherein said step of creating an auxiliary digital hash value includes the step of processing a digital representation of said message to reduce the message to a predetermined underlying character set.

10. A method according to claim 9, wherein said predetermined underlying character set is ASCII.

11. A method according to claim 8, wherein said step of creating an auxiliary hash value includes the step of:
changing all tab characters in at least a first portion of the message into blanks.

12. A method according to claim 8, wherein said step of creating an auxiliary hash value includes the step of:
eliminating control characters in at least a first portion of the message which do not produce a printable character.

13. A method according to claim 8, wherein said step of creating an auxiliary hash value includes the step of:
changing in at least a first portion of the message information which will result in the printing of one or more blanks to blanks.

14. A method according to claim 8, wherein said step of creating an auxiliary hash value includes the step of:
eliminating leading and trailing blanks in at least a first portion of the message; and
eliminating lines in the message which are totally blank.

15. A method according to claim 8 wherein said step of creating an auxiliary hash value includes the step of:
changing multiple contiguous blanks in the message to a single blank.

16. A method according to claim 8 wherein said step of creating an auxiliary hash value includes the steps of:
processing the message on a line by line basis and appending control information to the processed line information to delineate the end of a line.

17. A method according to claim 8, further including the step of verifying the genuineness of a printed document containing said message using said auxiliary hash value.

18. A method according to claim 17, wherein said step of verifying the genuineness includes the steps of:
entering the body of said message;
computing a white-space-hash value for said entered body of the message;
entering the digital signature from said printed version of said document; and
comparing the white-space-hash value from said digital signature with said computed white-space-hash value.

19. A method according to claim 8, further including the steps of:
creating said digital signature with a designated certificate;
verifying the genuineness of a document containing said message by:
entering the digital signature on a printed document and the seal associated with said digital signature;
computing the hash of said digital signature to generate a first value;
processing the hash of said seal with the signer's public key to generate a second value; and
comparing the first value with the second value to determine whether the document was signed with the designated certificate.

20. In a communications system for exchanging messages over a communications channel, apparatus for digitally signing a message to be transmitted comprising:
means for creating a digital hash value of the message to be transmitted based on the exact bit-for-bit data to be transmitted;
means for creating an auxiliary digital hash value to permit the subsequent verification of the genuineness of a printed version of the message; and
means for incorporating both hash values as part of a digital signature.

21. Apparatus according to claim 20, wherein said means for creating an auxiliary digital hash value includes means for processing a digital representation of said message to reduce the message to a predetermined underlying character set.

22. Apparatus according to claim 10, wherein said predetermined underlying character set is ASCII.

23. Apparatus according to claim 20, wherein said means for creating an auxiliary hash value includes:
means for eliminating control characters in the message which do not produce a printable character.

24. Apparatus according to claim 20, wherein said means for creating an auxiliary hash value includes:
means for changing information which will result in the printing of one or more blanks to blanks.

25. Apparatus according to claim 20, wherein said means for creating an auxiliary hash value includes:
means for eliminating leading and trailing blanks in the message; and
means for eliminating lines in the message which are totally blank.

26. Apparatus according to claim 20, wherein said means for creating an auxiliary hash value includes:
means for changing multiple contiguous blanks in the message to a single blank.

27. Apparatus according to claim 20, further including means for verifying the genuineness of a printed document containing said message using said auxiliary hash value.

28. Apparatus according to claim 27, wherein said means for verifying the genuineness includes:
means for entering the body of said message;
means for computing a white-space-hash value for said entered body of the message;
means for entering the digital signature from said printed version of said document; and means for comparing the white-space-hash value from said digital signature with said computed white-space-hash value.

29. Apparatus according to claim 20, further including:
means for creating said digital signature with a designated certificate verifying the genuineness of a document containing said message by:
means for entering the digital signature on a printed document and the seal of a representation of said signature;
means for computing the hash of said digital signature to generate a first value;
means for processing the hash of said seal with the signer's public key to generate a second value; and
means for comparing the first value with the second value to determine whether the document was signed with the designated certificate.

30. In a communications system for exchanging messages over a communication channel, a method for digitally signing said messages comprising the steps of:
assembling a digital package including a group of related but distinct message portions;
creating a digital list of the distinct message portions to be signed; and
processing a digital representation of at least said list of distinct message portions with the signer's private key, such that said distinct message portions are individually verifiable as having been signed and are verifiable as being a member of said group, whereby a plurality of distinct documents maybe organized, processed and signed as a package.

31. A method according to claim 30, further including the steps of:
computing a hash value for a plurality of the distinct message portions to be transmitted;
storing the hash values in said list of distinct message portions.

32. A method according to claim 30, wherein said processing step includes the step of:
computing a hash value reflecting at least said list of related message portions or hashes of the message portions; and
creating a seal for the signature with said hash value.

33. A method according to claim 31, including the step of computing an auxiliary hash value for at least one of said distinct message portions; and
incorporating both said hash value and said auxiliary hash value as part of the digital signature for said digital package.

34. A method according to claim 33, wherein said auxiliary hash value is a white-space-normalized hash value.

35. A method according to claim 30, wherein said step of assembling a digital package includes the step of creating a signature definition for said package.

36. A method according to claim 30, wherein said step of assembling a digital package includes the step of including at least one digital certificate portion in said package for permitting a recipient to determine that the signature is valid and properly authorized.

37. A method according the claim 30, wherein said step of assembling include the step of assembling a digital representation of a cover letter and an associated enclosed letter to be transmitted.

38. A method according to claim 30, wherein said step of assembling includes the step of assembling a digital representation of a cover letter and at least one digital data file.

39. A method according to claim 31, including the step of verifying that the digital package is genuine upon receipt of said package including the steps of:
calculating the hash value for at least a plurality of said related message portions; and
comparing the calculated hash values with corresponding values in the list of related message portions.

40. A method according to claim 31 further including the step of verifying that the digital package is genuine upon receipt of said package; said step of verifying including the step of verifying that the digital signature actually used to sign the package represents the valid digital signature for the package.

41. A method according to claim 40, wherein the step of verifying the digital signature includes the step of determining that a designated private key was used to sign each of the received message portions in the order shown in the received digital signature.

42. A method according to claim 30, including the step of verifying at least one of the message portions individually by using only the digital signature of the package.

43. In a communication system for exchanging messages over a communication system, apparatus for digitally signing said messages comprising:
means for assembling a digital package including a group of related but distinct message portions;
means for creating a digital list of the distinct message portions to be signed; and
means for processing a digital representation of at least said list of distinct message portions with the signer's private key, such that said distinct message portions are individually verifiable as having been signed and are verifiable as being a member of said group, whereby a plurality of distinct documents may be organized, processed and signed as a package.

44. Apparatus according to claim 43, further including:
means for computing a hash value for at least a plurality of the distinct message portions to be transmitted; and
means for storing the hash values in said list of distinct message portions.

45. Apparatus according to claim 43, wherein said means for processing includes:
means for computing a hash value reflecting at least said list of related message portions or hash values thereof and means for creating a seal for the signature.

46. Apparatus according to claim 44, including means for computing an auxiliary hash value for at least one of said distinct message portions; and
means for incorporating a hash value and said auxiliary hash value as part of the digital signature for said digital package.

47. Apparatus for according to claim 46, wherein said auxiliary hash value is a white-space-normalized hash value.

48. Apparatus according to claim 43, wherein said means for assembling a digital package includes means for creating a signature definition for said package.

49. Apparatus according to claim 43, wherein said digital package includes at least one digital certificate portion in said package for permitting a recipient to determine that the signature is valid and properly authorized.

50. Apparatus according to claim 43, wherein said digital package includes a digital representation of cover letter and an associated enclosed letter to be transmitted.

51. Apparatus according to claim 43, wherein said digital package includes a digital representation of a cover letter and at least one digital data files.

52. Apparatus according to claim 44, including means for verifying that the digital package is genuine upon receipt of said digital package including:
    means for calculating the hash value for at least a plurality of said related message portions; and
    means for comparing the calculated hash values with corresponding values in the list of related message portions.

53. Apparatus according to claim 43 further including means for verifying that the digital package is genuine upon receipt of said package, said means for verifying including means for verifying that the digital signature actually used to sign the package represents the valid digital signature for the package.

54. Apparatus according to claim 53, wherein the means for verifying the digital signature includes means for verifying that a designated private key was used to sign each of the received message portions in the order of shown in the received digital signature.

55. In a communication system for exchanging messages over a communications channel, a method of digitally signing a message to be transmitted comprising the steps of:
    creating a digital hash value of the message to be transmitted designed to permit subsequent verification of the genuineness of a printed version of the message including the step of processing the digital message to reduce the message to a predetermined underlying character set; and
    incorporating said digital hash value as part of a digital signature.

56. A method according to claim 55, wherein said underlying character is ASCII.

57. In a communication system having a plurality of terminal devices coupled to a channel over which users may exchange messages, at least some of said user's having a public key and an associated private key, a method for controlling authority in a hierarchical manner among a group of users, comprising the steps of:
    specifying at least first and second digital authority defining data structures, said data structures having digital values which can be associated with at least one user's private key,
    wherein said step of specifying includes the step of digitally specifying a set of authorities to allow a first user to digitally delegate authority to a second user, said delegated authorities allowing said second user to further digitally delegate authority to a third user; and
    digitally signing by the first user the second digital data structure so that signatures performed by the second user's private key associated with the second data structure will be recognized upon an analysis of the digital signature as having been granted said authority by the first user in accordance with the first user's authority-defining data structure.

58. A method according to claim 57, wherein said authority defining data structure defines the cosignature requirements which must accompany the signer's signature.

* * * * *